United States Patent
Rimmer et al.

(10) Patent No.: US 12,170,625 B2
(45) Date of Patent: Dec. 17, 2024

(54) BUFFER ALLOCATION FOR PARALLEL PROCESSING OF DATA BY MESSAGE PASSING INTERFACE (MPI)

(71) Applicant: Intel Corporation, Santa Clara, CA (US)

(72) Inventors: Todd Rimmer, Exton, PA (US); Sayantan Sur, Portland, OR (US); Michael William Heinz, Phoenixville, PA (US)

(73) Assignee: Intel Corporation, Santa Clara, CA (US)

( * ) Notice: Subject to any disclaimer, the term of this patent is extended or adjusted under 35 U.S.C. 154(b) by 904 days.

(21) Appl. No.: 16/944,072

(22) Filed: Jul. 30, 2020

(65) Prior Publication Data
US 2020/0358721 A1 Nov. 12, 2020

(51) Int. Cl.
| | | |
|---|---|---|
| H04L 12/54 | (2022.01) | |
| G06F 15/173 | (2006.01) | |
| H04L 49/90 | (2022.01) | |
| H04L 49/9047 | (2022.01) | |

(52) U.S. Cl.
CPC .... *H04L 49/9047* (2013.01); *G06F 15/17331* (2013.01); *H04L 49/9068* (2013.01)

(58) Field of Classification Search
CPC .................. H04L 49/9047; H04L 49/9068
See application file for complete search history.

(56) References Cited

U.S. PATENT DOCUMENTS

| | | | | |
|---|---|---|---|---|
| 6,782,537 B1 * | 8/2004 | Blackmore | ............. | G06F 9/524 718/107 |
| 9,391,845 B2 | 7/2016 | Heinz et al. | | |
| 9,811,403 B1 * | 11/2017 | Sur | ......... | G06F 9/546 |
| 10,015,056 B2 | 7/2018 | Heinz et al. | | |

(Continued)

OTHER PUBLICATIONS

Dmitry Kolmakov et al., "A Generalization of the Allreduce Operation" 1, 1, Article, Jan. 2016, 17 pgs.

(Continued)

*Primary Examiner* — Abdelnabi O Musa
(74) *Attorney, Agent, or Firm* — Compass IP Law PC

(57) ABSTRACT

Examples described herein relate to receiving, at a network interface, an allocation of a first group of one or more buffers to store data to be processed by a Message Passing Interface (MPI) and based on a received packet including an indicator that permits the network interface to select a buffer for the received packet and store the received packet in the selected buffer, the network interface storing a portion of the received packet in a buffer of the first group of the one or more buffers. The indicator can permit the network interface to select a buffer for the received packet and store the received packet in the selected buffer irrespective of a tag and sender associated with the received packet. In some examples, based on a received packet including an indicator that does not permit storage of the received packet in a buffer irrespective of a tag and source associated with the second received packet, the network interface is to store a portion of the second received packet in a buffer of the second group of one or more buffers, wherein the buffer of the second group of one or more buffers corresponds to a tag and source associated with the second received packet.

19 Claims, 19 Drawing Sheets

(56) References Cited

U.S. PATENT DOCUMENTS

| | | | | |
|---|---|---|---|---|
| 2010/0185718 A1* | 7/2010 | Archer | ............ | G06F 9/4856 |
| | | | | 709/201 |
| 2016/0323150 A1* | 11/2016 | Heinz | ............ | H04L 45/08 |
| 2019/0102236 A1* | 4/2019 | Sur | ............ | G06F 9/3004 |
| 2020/0133749 A1* | 4/2020 | Shin | ............ | G06F 40/205 |
| 2020/0202246 A1* | 6/2020 | Lin | ............ | G06F 16/24568 |
| 2020/0358721 A1* | 11/2020 | Rimmer | ............ | H04L 49/9047 |
| 2021/0271536 A1* | 9/2021 | Garzaran | ............ | G06F 9/5077 |
| 2022/0138021 A1* | 5/2022 | Rimmer | ............ | G06F 15/17331 |
| | | | | 718/105 |
| 2022/0292626 A1* | 9/2022 | Agostini | ............ | G06T 1/60 |

OTHER PUBLICATIONS

Li et al., "Designing MPI Library with On-Demand Paging (ODP) of InfiniBand: Challenges and Benefits", Network-Based Computing Laboratory Department of Computer Science and Engineering, The Ohio State University, Nov. 2016, 26 pages.

* cited by examiner

BUFFER ALLOCATION FOR PARALLEL PROCESSING OF DATA BY MESSAGE PASSING INTERFACE (MPI)

High-performance computing (HPC) has seen a substantial increase in usage and interests in recent years. In an HPC environment, large numbers of computing systems (e.g., blade servers or server modules) are configured to work in parallel to solve complex tasks. Each server may include one or more processors with associated resources (e.g., local memory for each processor), wherein each processor is operated as a compute node. The servers can be assembled into a group called a cluster to run parallelize applications. Parallelized HPC applications distribute complex computations across many compute nodes. During such operations, intermediate results from each process are often shared or consolidated by using collective operations.

DETAILED DESCRIPTION

Various types of network topologies and protocols may be used to interconnect nodes in an HPC environment. For example, some interconnects are compatible with InfiniBand or Ethernet. In an example HPC use of InfiniBand, the compute nodes run processes that use an Application Programming Interface (API) to exchange data and results with other processes running on other nodes. Examples of APIs include Message Passing Interface (MPI), Symmetric Hierarchical Memory Access (SHMEM), and Unified Parallel C (UPC). These processes can use a class of operations called "Collectives," which are used to enable communication and synchronization between multiple processes on multiple nodes. These Collective operations require communication between multiple computers in the HPC cluster.

Scaling and accelerating artificial intelligence (AI) training process is desirable whereby AI models are trained to perform inferences. As AI models grow in size, the communications overheads are also growing. Within the rapidly growing Deep Neural networks AI training market, data parallelism and some implementations of Model Parallelism can be used to parallelize computations across many nodes for improved time to solution. In AI training, data parallelism is often used to combine data from each compute node though use of AllReduce operations. Such AllReduce operations tend to be large, with 1 MB to 1 GB or even larger vectors being combined. A vector can include one or more scalar values (e.g., real values) used in linear algebra operations (e.g., AI weights being trained for the neural network). The size of the AllReduce vectors continue to grow as AI training models grow in complexity. For example, techniques for parallelizing HPC applications can leverage AllReduce operations to combine data from various processes on various nodes.

Message Passing Interface (MPI) is a communication protocol used for programming computers for parallel computing. AllReduce is an existing MPI function which can be implemented as a sequence of point-to-point sends and receives. The AllReduce operation can take a vector of data from each participant, apply a function across each element of the vector (e.g., sum, addition, average, minimum, or maximum) and construct a result vector which is distributed to the participants. AllReduce is implemented in a variety of other popular APIs, such as Uber's Horovod, nVidia's NCCL, Intel's MLSL, and so forth. These implementations and algorithms are similar or identical to those used inside various MPI implementations.

Figure 1:
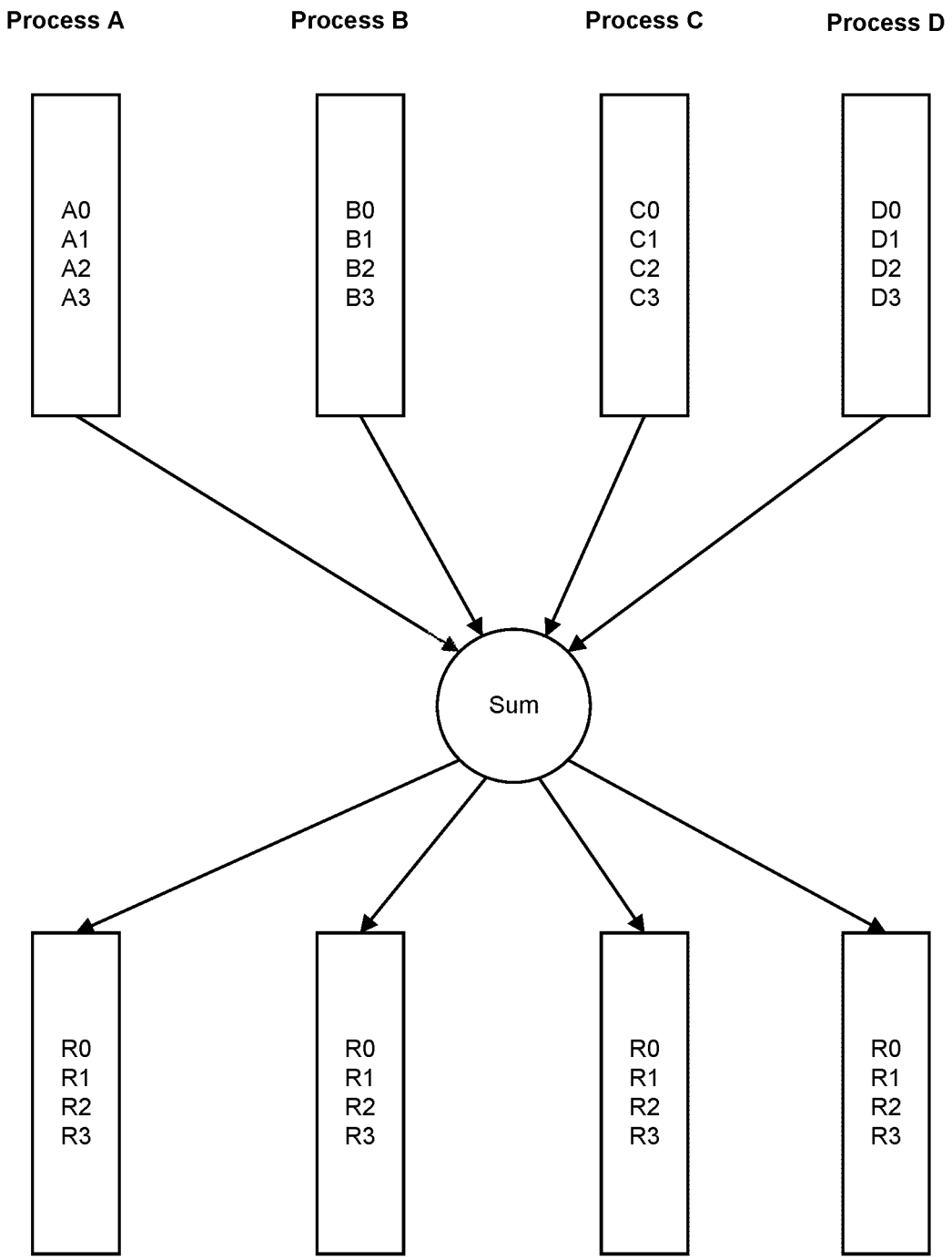
FIG. 1 depicts an example where processes contribute a vector in connection with parallel processing.

FIG. 1 depicts an example where four processes (e.g., processes A, B, C, and D) contribute a vector of 4 elements (e.g., process A contributes A0, A1, A2, A3; process B contributes B0, B1, B2, B3; and so forth). The individual elements are summed (e.g., R0<−A0+B0+C0+D0, R1<−A1+B1+C1+D1, and so forth) and the resulting vector (e.g., R0, R1, R2, R3) is distributed to all four participant processes. Within MPI implementations of AllReduce are implemented using MPI two-sided point-to-point communications. Point-to-point sends attempt to perform direct data placement via a mechanism in MPI called tag matching which associates receive buffers posted by the receiving application with incoming MPI messages.

Figure 2:
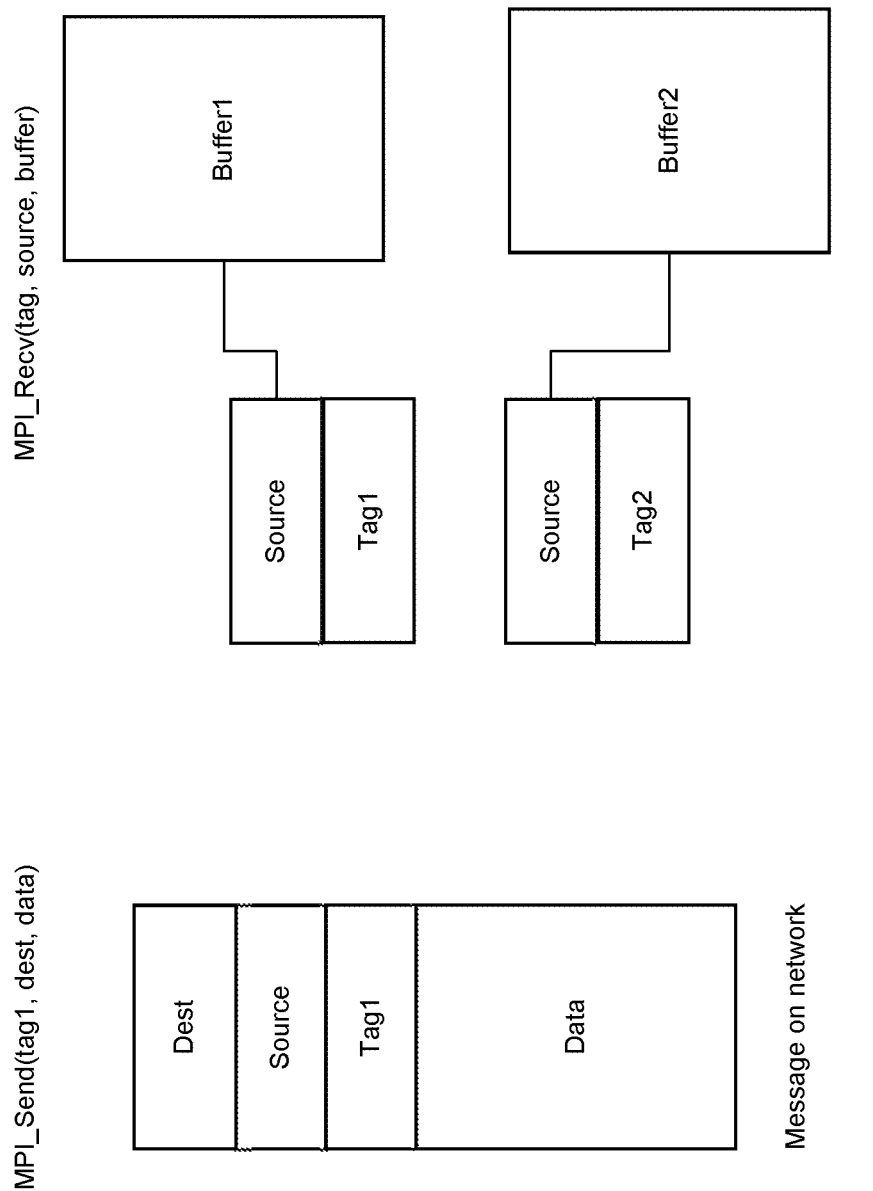
FIG. 2 shows an example in which a sender calls an MPI_Send API one or more times.

FIG. 2 shows an example in which a sender calls an MPI_Send API one or more times. For simplicity, a single sender calling MPI_Send only once is shown but multiple MPI_Send can be issued by the sender. The sender supplies in the MPI_Send an integer referred to as a tag, along with a destination identifier and data or identifier of data (e.g., pointer). The MPI_Send can include other input parameters described in relevant MPI specifications. The sender system can provide the tag, source identifier, destination identifier, and data in a message sent on the network to a receiver. The receiver can call an MPI_Recv API to supply a receive buffer identified by the tag and sending source. The receiver may call MPI_Recv more than two times despite FIG. 2 showing a single receiver which has called MPI_Recv twice with two different tags and buffers. As data arrives from network, the receiver stores data received from a sender to a receiver buffer associated with the sender (shown as "Source" in FIG. 2) and tag. Tag matching makes use of the source and tag in the network message to associate the message with a buffer on the receiver and hence place the data into the receiver's desired buffer. In this example, Buffer1 is to store data from a particular source and Tag1 value whereas Buffer2 is to store data from a particular source and Tag2 value.

Figure 3:
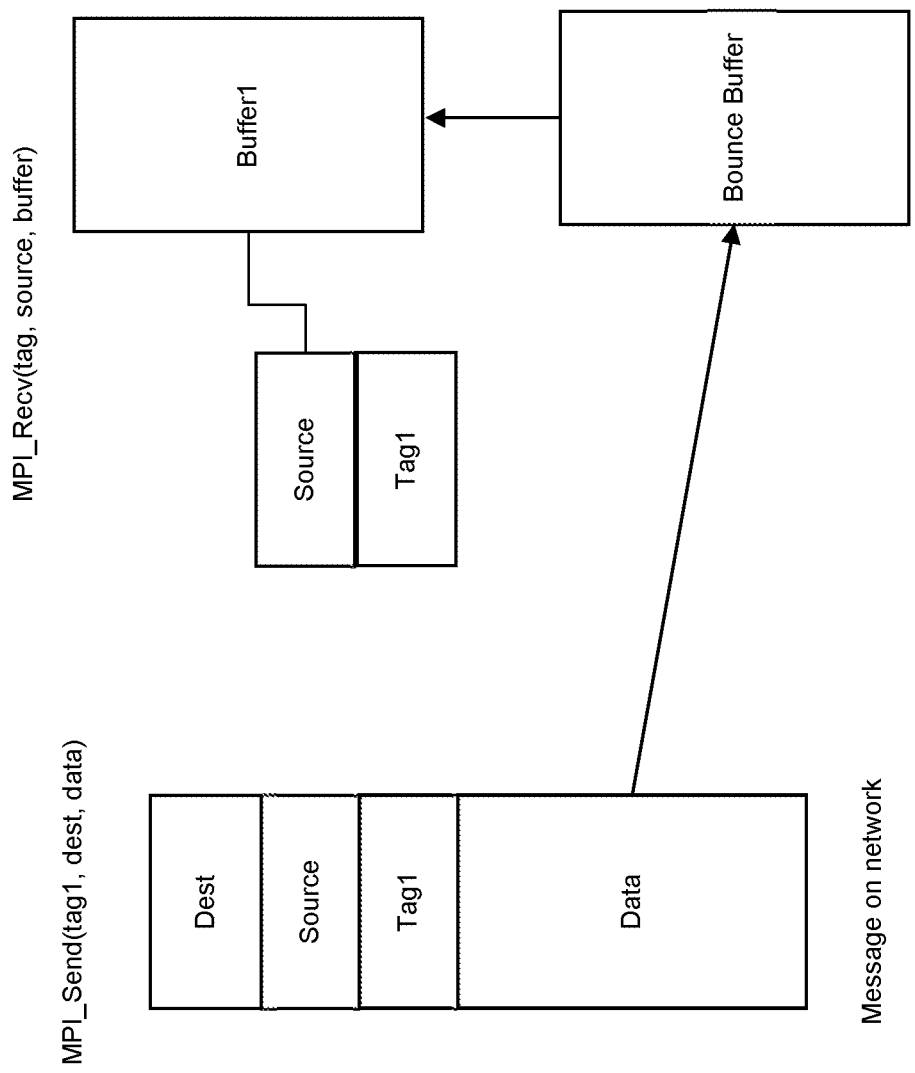
FIG. 3 shows an example of a message transfer in which a receiver buffer is not available at a time of receipt of a message.

FIG. 3 shows an example of a message transfer in which a receiver buffer is not available at a time of receipt of a message. For scenarios where MPI_Recv occurs after the sender issues its send, some MPI implementations can perform small message transfers using eager mechanisms where the recipient may place the data into a bounce buffer (e.g., temporary location), perform tag matching (e.g., using software to identify the right buffer), and then copy the data from the bounce buffer into the application requested buffer (Buffer1). Such mechanisms may also be used even if the message arrives after MPI_Recv has been called, for example if the network interface controller (NIC) does not implement tag matching offloads. Even if a tag matching is offloaded to a NIC, the NIC itself may use a bounce buffer (or retransmission based mechanisms) if the data arrives before the receiver has called MPI_Recv as calling MPI_Recv can occur after the sender issues its send. In some scenarios, 40% or more of the messages arrive prior to MPI_Recv being called.

Figure 4A:
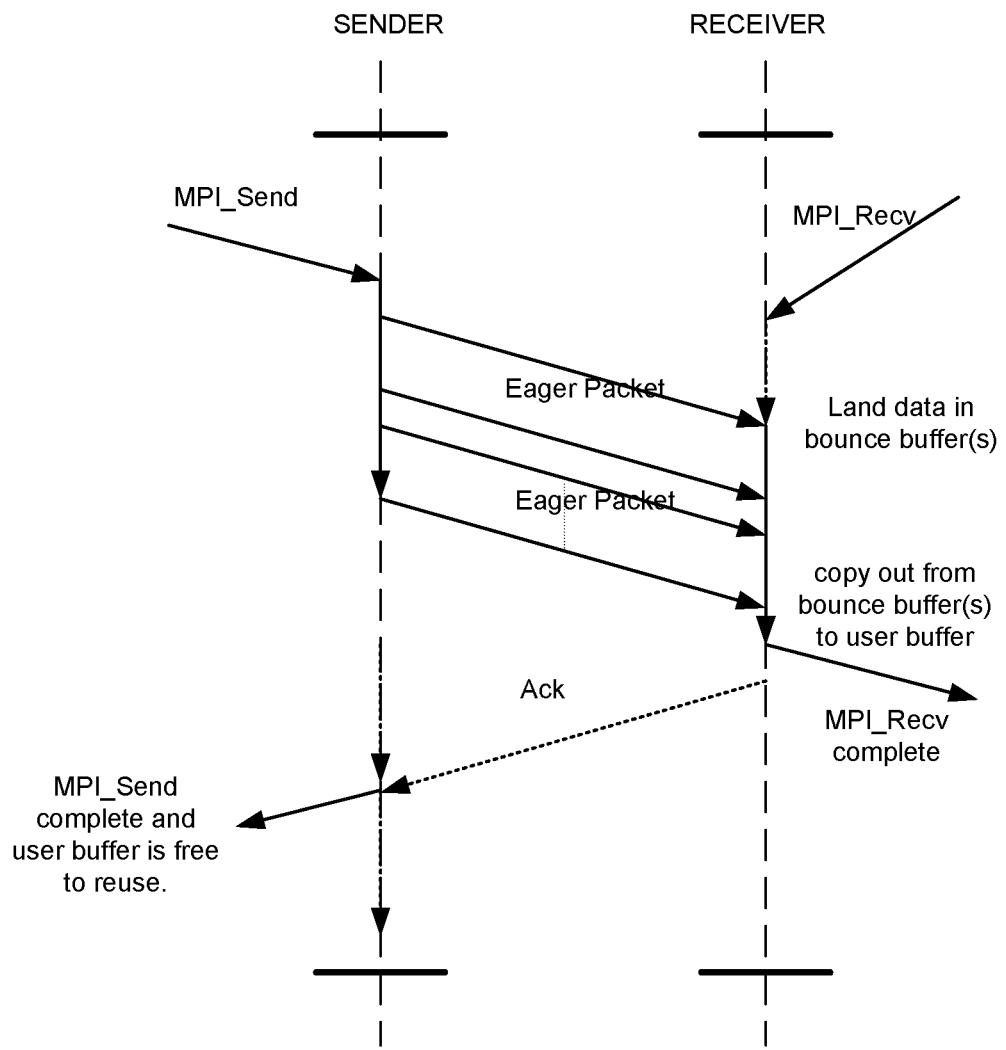
FIG. 4A shows a sequence of events for an eager transfer scheme.

FIG. 4A shows a sequence of events for an eager transfer mechanism. Such mechanisms may be used for messages transmitted using one or more network packets. An MPI_Send API can cause transmission of multiple "Eager" packets which arrive at a receiver before MPI_Recv API configures a buffer for each of the packets or for NICs which do not implement tag matching offloads. In such case, the packets are stored in intermediate bounce buffers and content of the intermediate bounce buffers are copied to user buffers. An MPI_Recv complete API can indicate content of user buffers is available to access by an MPI collective. The receiver can send an acknowledgement of receipt of packets (Ack) to the sender and MPI_Send API can indicate a user buffer at the sender side is free to reuse.

Figure 4B:
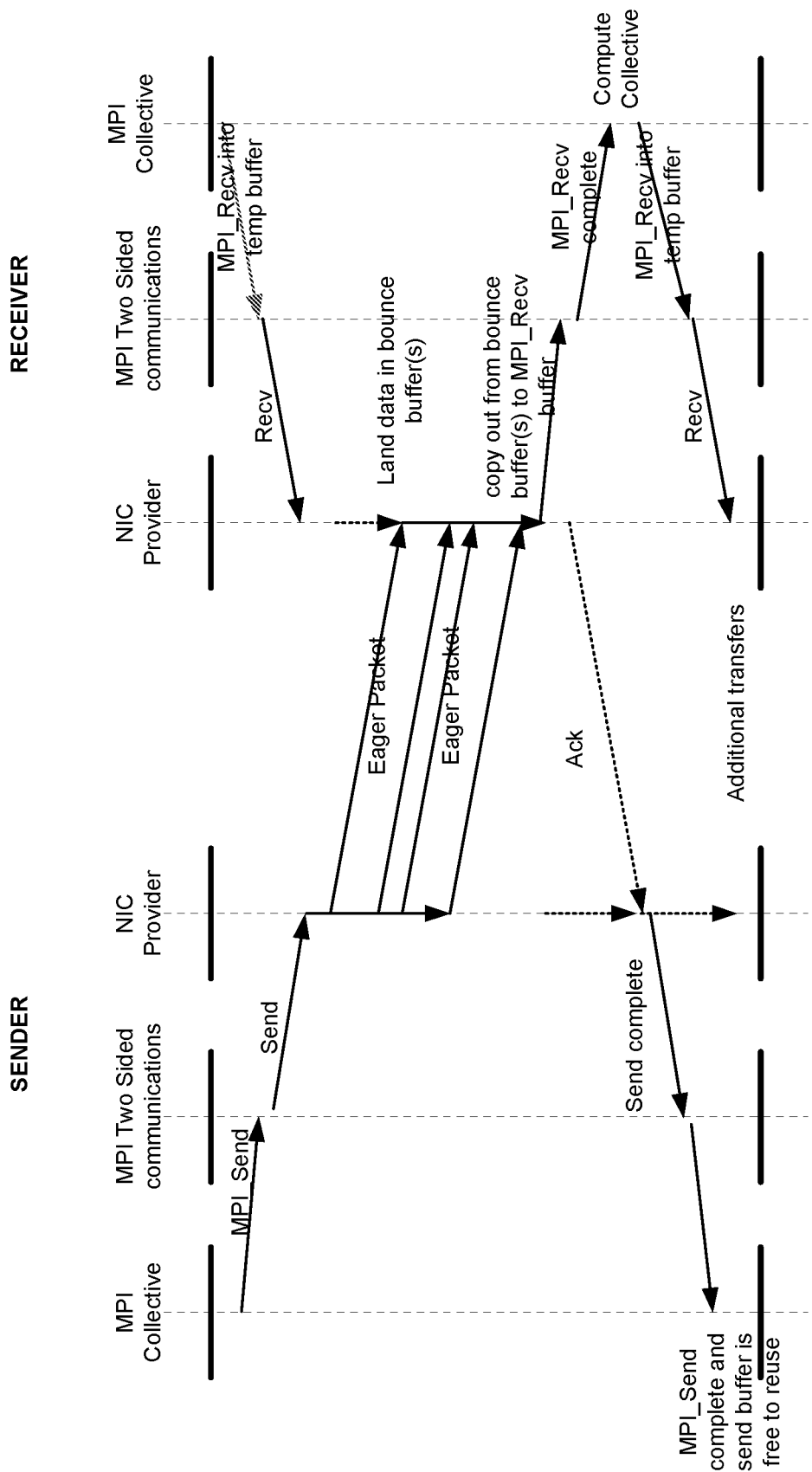
FIG. 4B shows an example operation in an AllReduce scheme.

FIG. 4B shows an example operation in an AllReduce computation. The MPI Collective can be implemented as a sequence of point-to-point MPI_Send and MPI_Recv calls (e.g., MPI Two Sided communications) to copy vectors to a participant. The receiver MPI Collective performs a selected operation (e.g., sum) to accumulate the final result vector. More specifically, in this example, two participants (e.g., a sender and a receiver) use MPI_Send and MPI_Recv to transfer a vector of data using an eager mechanism. As the individual eager packets arrive, the receiver NIC places content of the packets into an intermediate bounce buffer. The NIC software and/or hardware examines the packet, performs tag matching, and then copies the data into the buffer supplied by the MPI Collective as part of the MPI_Recv call. Once the MPI_Recv is complete, the receiver combines the data in the temporary buffer with its ongoing computation result (e.g., Compute Collective). The receiver and sender can repeat the sequence, with a different pairing of participants.

Figure 5:
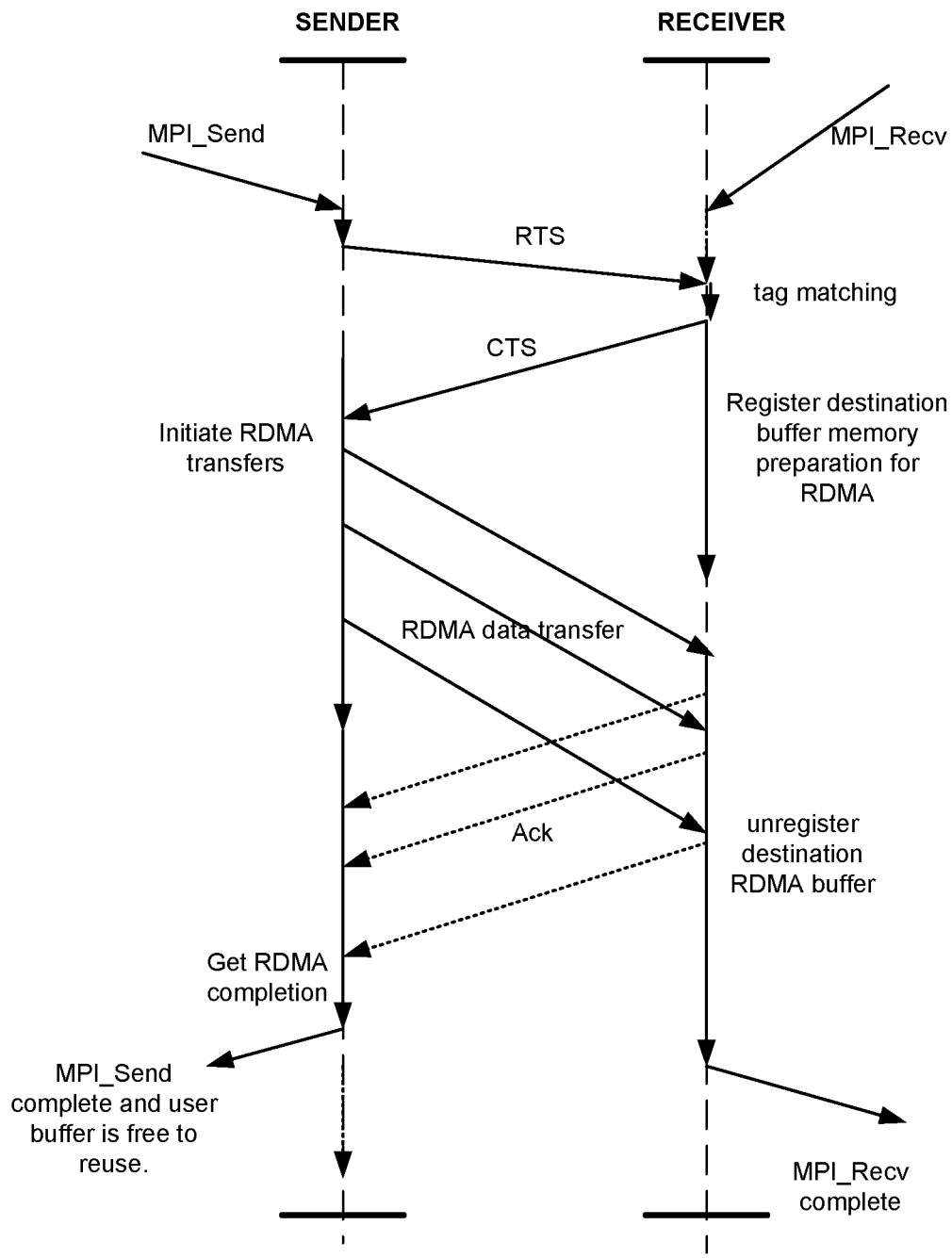
FIG. 5 shows an example flow.

FIG. 5 shows an example flow whereby some large message transfers may use "rendezvous" mechanisms. Such mechanisms require the sender to provide a "Request To Send" (RTS) message with the tag, source, destination, size and other information about the message. Transfer of data is delayed until the receiver is ready and has designated a specific buffer for receipt of the data at which time one or more "Clear to Send" (CTS) messages are sent to the sender along with remote direct memory access (RDMA) addresses and other identifying information for the desired receiver buffer.

Upon receiving the CTS, the sender may make use of RDMA to send data to the receiver using one or more RDMA packets. The CTS could be an RDMA Read or the CTS could be a message to which the sender reacts with an RDMA Write. Data for large messages can be directly placed into a final application specified buffer without the receiver copying the data from an intermediate "bounce buffer" to the final application specified buffer.

In some MPI implementations, Eager messages work well for small messages since they avoid transmission of extra network packets for RTS and CTS but can incur at least one additional NIC or central processing unit (CPU) resource utilization for data copy operations. A data copy operation can increase latency and increase resource utilization for availability of vectors at a receiver. For larger messages, the overhead of the RTS and CTS is compensated for through direct data placement and no CPU data copies, however the RTS and CTS represent some additional network latency and network overhead.

Various embodiments provide for configuring a network interface to identify whether a packet, sent as part of a Message Passing Interface (MPI) collective computation, that are permitted to be copied to a buffer selected by a receiver network interface. Configuring a network interface to identify whether a packet, sent as part of a Message Passing Interface (MPI) collective computation, that are permitted to be copied to a buffer selected by a receiver network interface comprises identifying a tag, destination, and data that is permitted to be copied to a buffer selected by a receiver network interface.

Various embodiments provide for configuring a network interface with an allocation of a group of one or more buffers to store data to be processed by a Message Passing Interface (MPI) layer. Based on a received packet including an indicator that permits storage of the received packet in a buffer selected by the network interface irrespective of a source or tag associated with the packet, the network interface can store a portion of the received packet in a buffer of the first group of the one or more buffers. However, where the received packet includes an indicator that does not permit storage of the received packet in a buffer selected by the receiver network interface irrespective of a source or tag associated with the packet, the receiver network interface stores a portion of the received packet in a buffer corresponding to a tag and source associated with the received packet.

Figure 6:
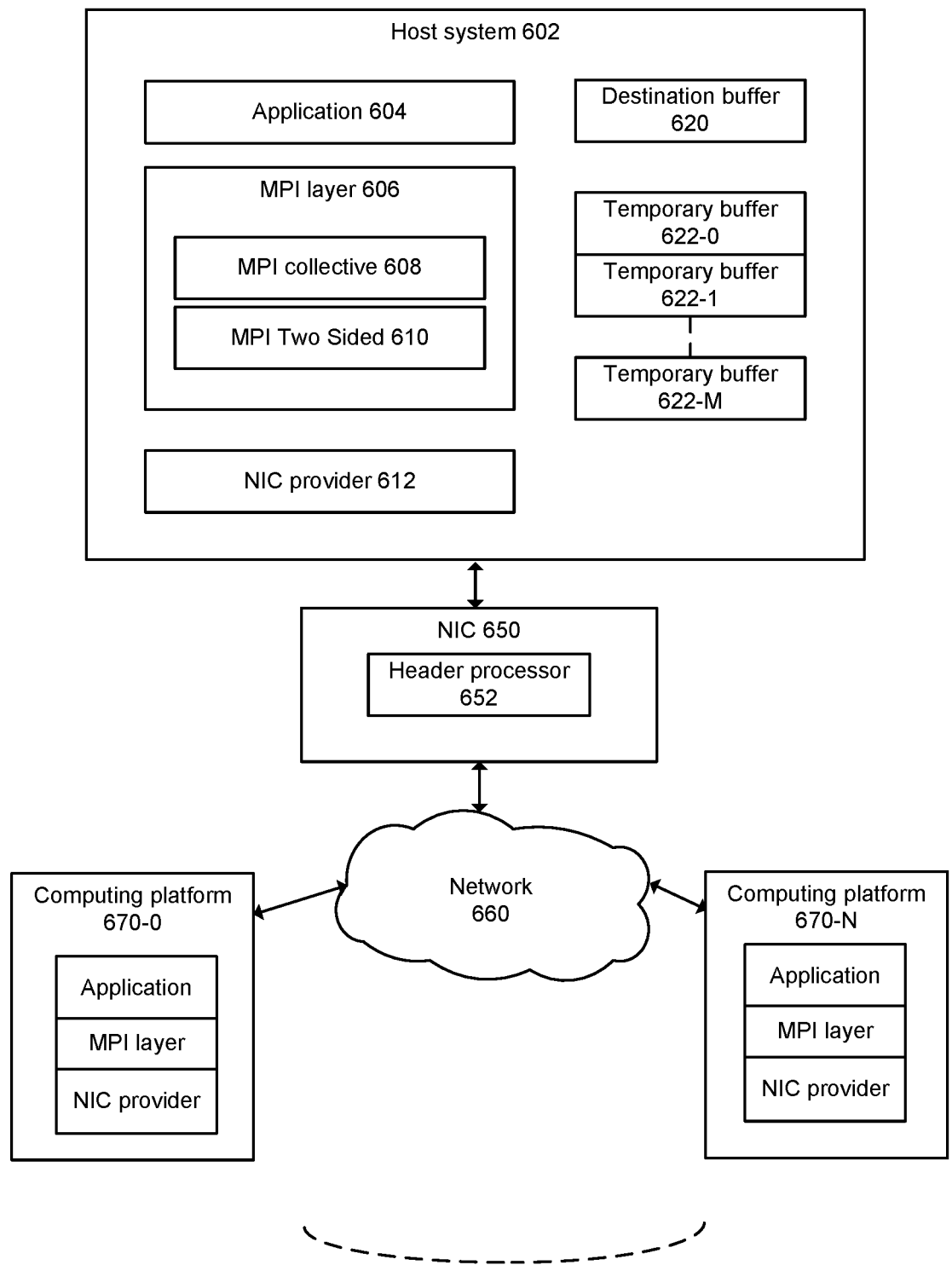
FIG. 6 depicts an example system.

FIG. 6 depicts an example system. For example, the system can be used in a node with a host system computing platform 602 with access to a NIC 650 to transmit and receive packets. For example, the system can be used as part of a data center, server, rack, blade, and so forth. In some examples, the system can execute a process or application as part of a parallel computing environment such as AllReduce or Reduce, or others. The parallel computing environment can attempt to perform training of an AI model. As part of a parallel computing environment, the system can be capable of receiving data from other systems parallel computing environment and sending data to other systems in the parallel computing environment.

For example, host 602 can include one or more processors, accelerators, memory devices, storage devices, persistent memory devices, as well as bus and interconnect technologies to provide communication between the devices. Memory devices can be available as connected to a circuit board in host system 602, as connected to a circuit board in NIC 650, or as memory accessed through a bus or high speed interface (e.g., PCIe, CXL, or DDR) to host system 602 and NIC 650. In some examples, one or more processors can execute application 604 that is executed as part of a parallel computing environment such that other instances of the application execute on other computing platforms such as any of platforms 670-0 to 670-N, where N is an integer that is 1 or more. For example, as part of an execution of AllReduce using parallel computation, to perform sharing of vectors with two or more other platforms, application 604 executing on host system 602 can utilize processor executed MPI layer 606 and any of platforms 670-0 to 670-N can also utilize an MPI layer. Other message passing interface layers can be used other than MPI such as Symmetric Hierarchical Memory Access (SHMEM) or Unified Parallel C (UPC).

Application 604 can call MPI collective 608 to initiate an MPI collective computation. Application 604 can identify a vector stored in a register, cache, or memory to MPI collective 608 and identify destination buffer 620 to receive a result of a computation performed by host system 602 or any of platforms 670-0 to 670-N. MPI collective 608 can issue transactions for vectors from a temporary buffer (e.g., send operation) or receive vectors in a temporary buffer (e.g., receiver operation) using MPI two sided 610. Temporary buffers can be allocated in any volatile or non-volatile memory regions and are depicted as temporary buffers 622-0 to 622-M, where M is an integer that is 2 or more. MPI collective 608 can perform computation on contents of a temporary buffer such as summation, averaging, subtraction, division, multiplication, determining a maximum or minimum value, and so forth. Content stored in a temporary buffer can be a vector or portion (e.g., subset) of a vector.

When a collective job commences, MPI layers on computing platforms can set up temporary buffers for sending and receiving data. Data can include one or more vectors or portions thereof. In accordance with some embodiments, when a collective job commences or at other times, MPI collective 608 or NIC provider 612 can set up and identify one or more temporary buffers for NIC 650 to use to store data or payloads from messages received as part of a parallel computation operation. NIC provider 612 can be a user space interface between MPI layer 606 and NIC 650 to permit MPI layer 606 and application 604 to use transmit or receive operations of NIC 650. In some examples, NIC provider 612 can be a kernel space driver. In other examples, NIC provider 612 can be a user space provider (e.g., driver).

For example, in connection with transmission of data to other platform(s) in a parallel computing environment, MPI collective 608 can configure MPI two sided 610 using an application program interface (API) having semantics such as MPI_Send_alloc(tag, dest, data). Field flag can indicate whether the sender requests that the receiver NIC is to select one or more buffers allocated for any received packet with such flag set to true (e.g., 1 bit) or some other multiple bit code (e.g., a special value in Field tag). Field dest can identify a destination platform (e.g., IP address or MAC address or a process number within the job). Field data can indicate a memory address in which data to be transmitted is stored.

For example, in connection with receipt of data from a sender in a parallel computing environment, MPI collective 608 can configure MPI two sided 610 using an application program interface (API) having semantics such as MPI_Recv_alloc(tag, source, &buffer). Field tag can indicate a tag value or indicator of a received message that can be placed in a buffer identified by field buffer. Field &buffer can indicate that the NIC is to allocate a buffer and return the address of the chosen buffer and can identify a particular buffer associated with a source specified in a specified source field (e.g., IP address or MAC address or a process number within the job).

In accordance with embodiments described herein, MPI collective 608 can configure NIC 650 to include the flag set to true in a packet to be sent to a platform in a parallel computing environment to permit the platform to select a buffer for a portion of the packet irrespective of a tag and sender associated with the received packet. MPI collective 608 can identify available temporary buffers to NIC 650 and configure NIC 650 to select a buffer among available buffers for any packet with a the flag set to true.

As is described herein, NIC 650 can provide network access for transmitting packets to other platforms or receiving packets from other platforms in connection with parallel computation. NIC 650 can include various software, devices, and ports that prepare packets for transmission to a network or other medium or process packets received from a network or other medium. In some examples, a NIC 650 may be embodied as part of a system-on-a-chip (SoC) that includes one or more processors, or included on a multichip package that also contains one or more processors. In some examples, a NIC 650 can refer to a network interface, network interface controller or a network interface card. Based on NIC 650 receiving a packet with a flag indicating NIC 650 can select a buffer in which to store a portion of a received packet, NIC 650 can select a buffer from among temporary buffers 622-0 to 622-M that are identified to NIC 650 as available for use. For example, header processor 652 can process headers (e.g., destination address IP or MAC, destination application or process, MPI tag, flag indicating can use available buffers, application data or protocol control) of received packets to determine at least a destination buffer for received packets.

For example, header processor 652 can be configured by MPI layer 606 with a list of available temporary buffers 622-0 to 622-M and header processor 652 can select a temporary buffer in which to store packet with a flag indicating NIC 650 can select a buffer in which to store a portion of a received packet irrespective of a tag and source associated with the received packet. NIC 650 can copy the packet to a selected temporary buffer and indicate a tag identifier received with the packet that is stored in the selected temporary buffer. NIC 650 can copy the portion of the packet (e.g., vector or portion of a vector) into a temporary buffer. Computations can be performed (e.g., summation) based on vectors (or portions thereof) received from other nodes and stored in one or more temporary buffers. A result or intermediate (e.g., non-final) result of a computation can be copied to destination buffer 620 for access by application 604.

In some examples, received packets include a subset of a vector and the subset of the vector is stored in a temporary buffer and content of the temporary buffer is processed by MPI collective 608 after an entirety of the vector is received. In some examples, MPI layer 606 can configure NIC 650 to be able to store a portion of a packet into a particular buffer among multiple temporary buffers so that a subset of a vector from a packet is stored into a buffer and another subset of the vector from another packet (or a same packet) is stored into another buffer and MPI collective 608 can process each subset of the vector when the subset is available in a buffer. After a last subset of the vector is received, the MPI collective 608 can complete computation using the vector and provide a result to destination buffer 620. The MPI API can allow any computation, including application supplied functions and predefined functions, such as but not limited to: minimum, maximum, summation, product, logical AND, bit wise AND, logical OR, bit wise OR, logical exclusive OR, bit wise exclusive OR (XOR), and so forth. An application can use the computation as an input to any subsequent computations. An application can use a result from collective computation in the destination buffer 620 to train an AI model or perform inference operations. For example, the application can include a library or component that performs AI operations.

Any processor or core can execute a virtualized execution environment. In some examples, application 604, MPI layer 606, and NIC provider 612 can execute within a virtualized execution environment. A virtualized execution environment (VEE) can include at least a virtual machine or a container. VEEs can execute in bare metal (e.g., single tenant) or hosted (e.g., multiple tenants) environments. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux®, FreeBSD, VMWare, or Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container. The isolated nature of containers provides several benefits. First, the software in a container will run the same in different environments. For example, a container that includes PHP and MySQL can run identically on both a Linux computer and a Windows® machine. Second, containers provide added security since the software will not affect the host operating system. While an installed application may alter system settings and modify resources, such as the Windows® registry, a container can only modify settings within the container.

A virtualized infrastructure manager (VIM) or hypervisor (not shown) can manage the life cycle of a VEE (e.g., creation, maintenance, and tear down of VEEs associated with one or more physical resources), track VEE instances, track performance, fault and security of VEE instances and associated physical resources, and expose VEE instances and associated physical resources to other management systems.

Application 604 or VEE can configure or access NIC 650 using SIOV, SR-IOV, MR-IOV, or PCIe transactions. For example, NIC 650 can be presented as a physical function (PF) to any server, application or VEE. In some examples, host system 602 and NIC 650 can support use of single-root I/O virtualization (SR-IOV). PCI-SIG Single Root IO Virtualization and Sharing Specification v1.1 and predecessor and successor versions describe use of a single PCIe physical device under a single root port to appear as multiple separate physical devices to a hypervisor or guest operating system. SR-IOV uses physical functions (PFs) and virtual functions (VFs) to manage global functions for the SR-IOV devices. PFs can be PCIe functions that can configure and manage the SR-IOV functionality. For example, a PF can configure or control a PCIe device, and the PF has ability to move data in and out of the PCIe device.

In some examples, host system 602 and NIC 650 can interact using Multi-Root IOV (MR-IOV). Multiple Root I/O Virtualization (MR-IOV) and Sharing Specification, revision 1.0, May 12, 2008, from the PCI Special Interest Group (SIG), is a specification for sharing PCI Express (PCIe) devices among multiple computers.

In some examples, host system 602 and NIC 650 can support use of Intel® Scalable I/O Virtualization (SIOV). A SIOV capable device can be configured to group its resources into multiple isolated Assignable Device Interfaces (ADIs). Direct Memory Access (DMA) transfers from/to each ADI are tagged with a unique Process Address Space identifier (PASID) number. Unlike the coarse-grained device partitioning approach of SR-IOV to create multiple VFs on a PF, SIOV enables software to flexibly compose virtual devices utilizing the hardware-assists for device sharing at finer granularity. Performance critical operations on the composed virtual device can be mapped directly to the underlying device hardware, while non-critical operations can be emulated through device-specific composition software in the host. A technical specification for SIOV is Intel® Scalable I/O Virtualization Technical Specification, revision 1.0, June 2018.

Figure 7:
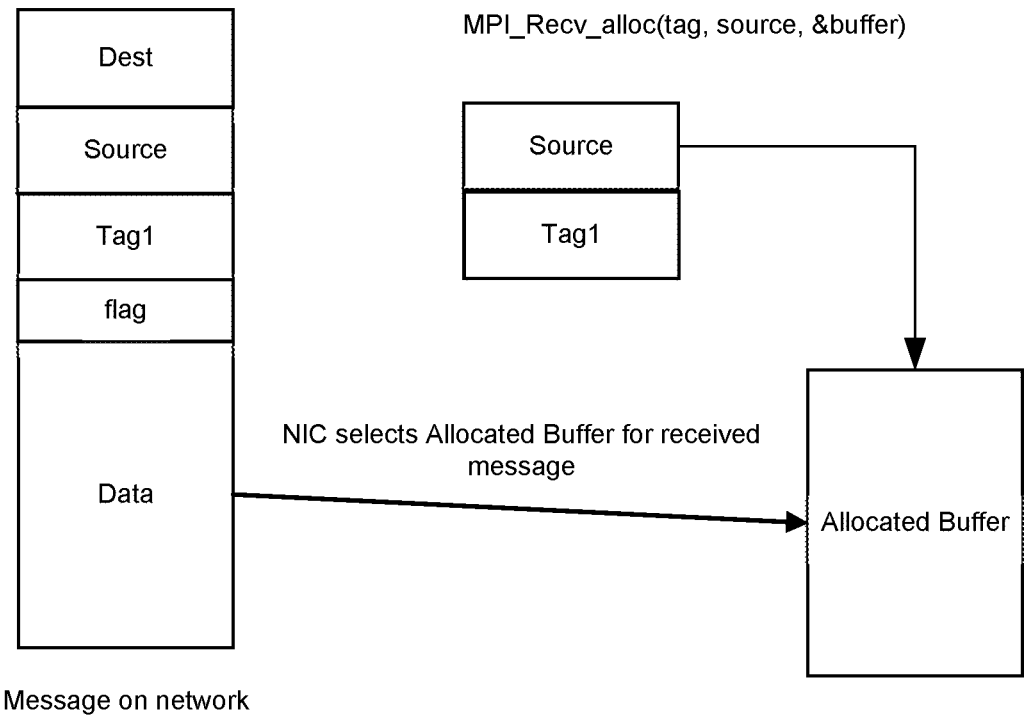
FIG. 7 depicts an example in accordance with some embodiments.

FIG. 7 depicts an example in accordance with some embodiments. A sender MPI layer can configure a sender NIC to include, in a packet, a flag that indicates the receiver NIC can store the received message in a buffer selected by the receiver NIC irrespective of a tag or source of the packet. The sender MPI layer can use an API such as MPI_Send_alloc(tag, dest, data) described earlier to set such flag and include such flag in a packet. In some examples, a receiver NIC can place intermediate data used by AllReduce or other computation into buffers selected by the receiver NIC. For example, an MPI layer internal API can be used to allocate a pool of properly sized buffers with sufficient for storage of messages expected to arrive to the receiver NIC.

A destination, source, tag in a received packet can inform a receiver NIC to store portions of the packet or an entirety of the packet in an available allocated buffer instead of the receiver NIC using a bounce buffer or the receiver NIC waiting for the receiver application to configure the receiver NIC where to store the message. In some examples, round trip messaging (e.g., CTS or RTS) is not used and copy to and from an intermediate (bounce) buffer is not used. In some examples, a receiver NIC does not use tag matching to identify a destination buffer and selects a buffer, stores content from the received packet in the buffer, and indicates a tag associated with content of the selected buffer to an MPI layer.

Buffers can be allocated for the receiver NIC at the start of an application or start of the AllReduce operation (or other operations). The buffer can be among buffers allocated by an MPI layer for use by the receiver NIC to store packet content. The receiver MPI layer can use an API such as MPI_Recv_alloc(tag, source, &buffer) described earlier to allocate buffers that a receiver NIC can use to select a buffer for a received message. Identification of a buffer can include supply an address (e.g., virtual or physical memory address) of the selected buffer to the caller in the buffer argument.

Various embodiments may not alter how point-to-point messages outside the selected collectives could occur, and can use eager, rendezvous, RDMA, tag matching, and so forth. Such messages would not be marked with the flag or special tag, and hence could undergo traditional processing mechanisms such as use of a bounce buffer or tag matched buffer.

Figure 8A:
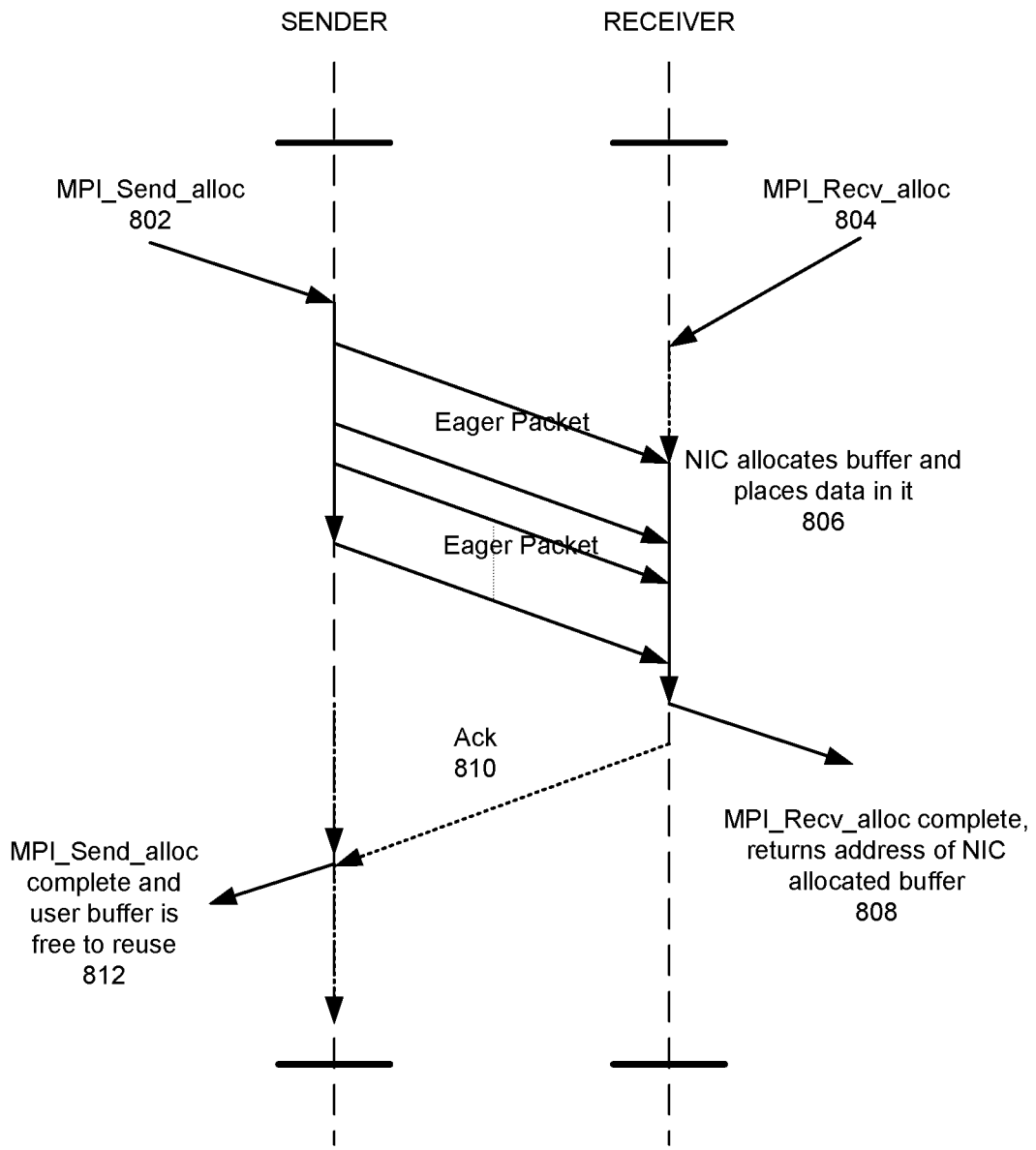
FIG. 8A depicts an example sequence or single operation to allocate a buffer for use to store data to be processed by a receiver MPI layer.

FIG. 8A depicts an example sequence or single operation to allocate a buffer for use to store data to be processed by a receiver MPI layer. At 802, a sender-side MPI layer (not shown) can issue instruction MPI_Send_alloc to cause a single bit flag to be set in a message to be sent to a receiver to identify messages to be stored in one or more allocated buffers selected by a receiver NIC. At 804, a receiver MPI layer can perform MPI_Recv_alloc to allow subsequent received messages to make use of NIC allocated buffers. Upon receipt of a message for the collective with a flag indicating the receiver NIC can select a buffer for the message, at 806, the receiver NIC can allocate one or more of the allocated buffers to store the received message(s), copy the incoming data into the selected buffer, and provide a tag from the received packet and the buffer's address to the MPI layer that called MPI_Recv_alloc.

At 808, when an MPI collective finishes processing received data from the allocated buffer(s), the MPI collective can accumulate or copy the data from the allocated buffer into the application result buffer and then either free the buffer or allocate the freed buffer to the receiver NIC for reuse for subsequent received messages. Various embodiments can potentially avoid data copies, and can also reduce memory registration overhead since these buffers can be preregistered once when the pool is created. According to various embodiments, both large and small messages inside the collective can make use of eager transfer mechanisms on the wire or network medium. RTS/CTS transmission overheads can be avoided as can the need to register the collective temporary buffers for remote RDMA or received packets.

At 810, the receiver NIC can send an acknowledgement (Ack) to the sender. At 812, the sender MPI layer can free a buffer for use by another data to be sent to a same or different receiver NIC.

Note that any actions described herein can occur at the same time, overlapping time spans, or in the sequence provided. For example, 802 and 804 can occur at the same time or overlapping time spans. For example, 808 and 810 can occur at the same time or overlapping time spans.

Various operations can be performed within the MPI layer and the interfaces (e.g., MPI_Send_alloc, MPI_Recv_alloc) are not exposed to applications and interfaces can be carefully controlled and limited to specific needs of the relevant collectives such as MPI_AllReduce. Since the MPI_Recv_alloc API is not exposed to applications, MPI_Sends using NIC allocated buffers could also be identified by one or more reserved Tag values which are not available for use by applications. Various embodiments can also be used for some other collectives, such as MPI_Reduce, which internally use temporary buffers that are not exposed to the application. Other examples of use include reduce-scatter.

Figure 8B:
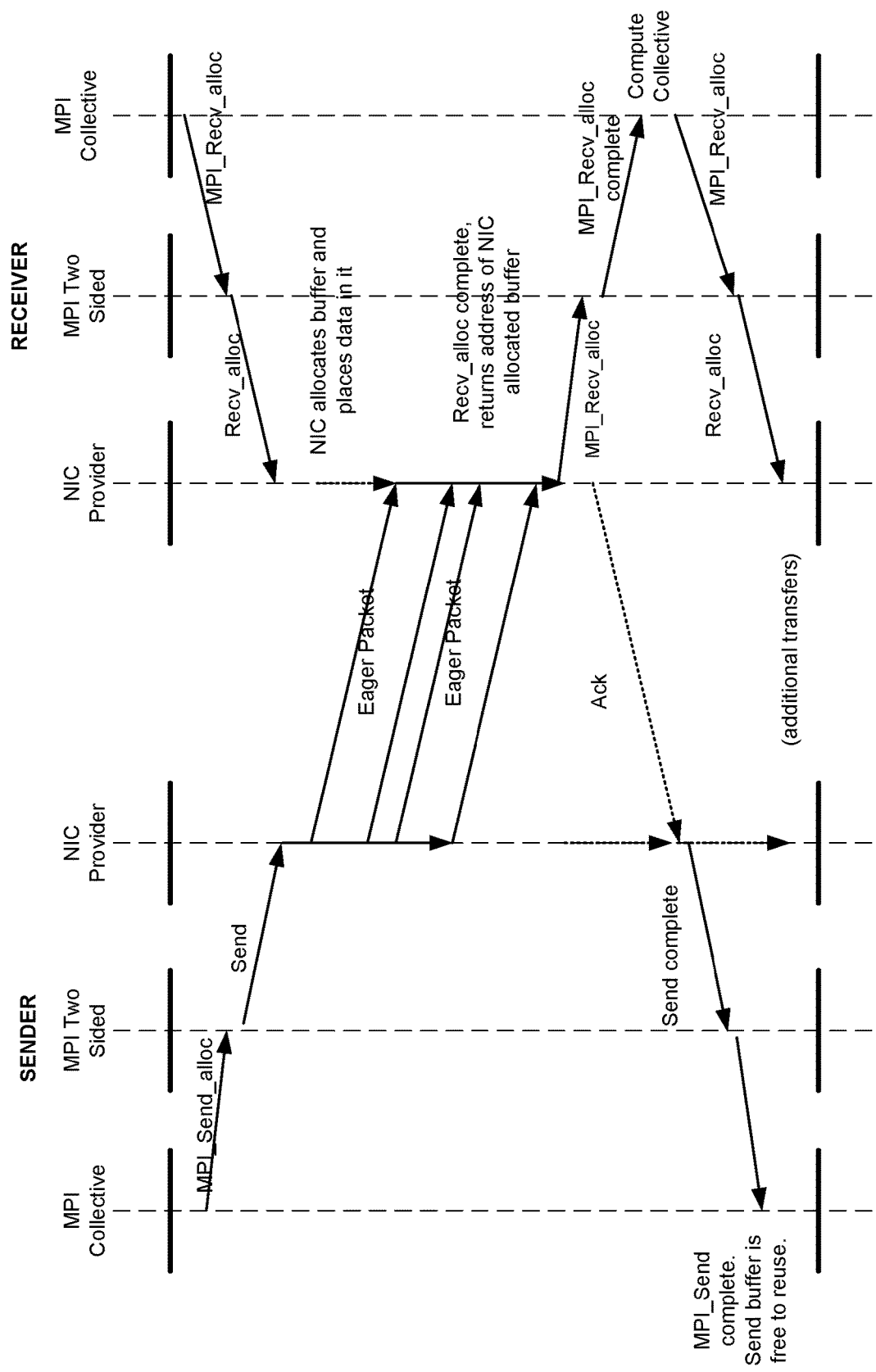
FIG. 8B depicts an example sequence or single operation to allocate a buffer for use to store data to be processed by a receiver MPI layer.

FIG. 8B depicts an example sequence or single operation to allocate a buffer for use to store data to be processed by a receiver MPI layer. Using the operations shown in FIG. 8B, the overhead of the data copy between a bounce buffer and the MPI Collective's MPI_Recv buffer can be removed. In addition, network traffic and overhead from sending RTS or CTS may be avoided. From the perspective of the MPI Collective and the NIC provider, the AllReduce computation can be implemented as a sequence of point to point sends and receives of the input vectors and intermediate results. In some examples, at the sender side, MPI collective can use MPI_Send_alloc (described earlier) call to an MPI two sided communication layer and MPI two sided layer issues a Send command to a NIC provider or NIC driver to cause transmission of a packet with a flag that indicates the receiver NIC can select a buffer for content of the packet.

In some examples, at the receiver side, MPI Collective can use a call MPI_Recv_alloc indicate to expect receipt of a message with a flag that indicates the receiver NIC is to select a buffer for the received message and store the received message in a NIC allocated buffer. As described earlier, MPI_Recv_alloc can include fields tag, source, and buffer. In fields of MPI_Recv_alloc, MPI two sided can indicate expectation to receive a tag from a particular source (e.g., source IP or source MAC address) and the receiver NIC can use choose any allocated buffer to use to place a message with a particular tag into the allocated buffer and provide to the caller the address of the buffer selected by the NIC.

In some examples, multiple packets can be transmitted from the sender to the receiver NIC. When a packet arrives at the receiver NIC with a flag that indicates the receiver NIC can select a buffer for content of the packet, the receiver NIC selects a buffer from available buffers and places the data from the packet in the selected buffer. NIC provider or driver provides an identifier of the buffer that stores the packet as well as a tag identifier and source identifier in call MPI_Recv_alloc to MPI Two Sided communication layer. NIC provider can provide a MPI_Recv_alloc call to MPI Two Sided layer with fields tag, source, and buffer. In fields of MPI_Recv_alloc, NIC provider can indicate a tag received from a particular source and a selected buffer used store received data in a received message.

In some embodiments, a list of NIC allocated buffers may be provided to the MPI Collective. In some embodiments, buffers can be sized to each hold exactly one packet or a maximum payload size of a single payload.

The MPI collective can combine the data from multiple packets in the identified buffer with its ongoing computation result (e.g., Compute Collective). The receiver and sender then repeat the sequence, with a different pairing of participants.

At or after the multiple packets are received by the receiver, at the receiver side, a NIC provider or driver can cause the receiver NIC to send an acknowledgement (ACK) to the sender NIC. At the sender side, the NIC provider or driver provides a Send complete indication to an MPI Two sided communication layer and the MPI Two sided communication layer issues an MPI_Send complete indication to the MPI collective. A send buffer can be used to send data in another packet or receive data from another packet.

Note that a computing platform can include both sender and receiver side capabilities to send or receive data to platforms in a parallel computing environment.

In some embodiments, the NIC allocated buffer may be allocated from the pool of buffers as the bounce buffer in the manner described with respect to FIG. 3. Such an embodiment can permit a NIC designed for the system of FIG. 3 to be used without modification in the embodiments of FIG. 8B.

Figure 9:
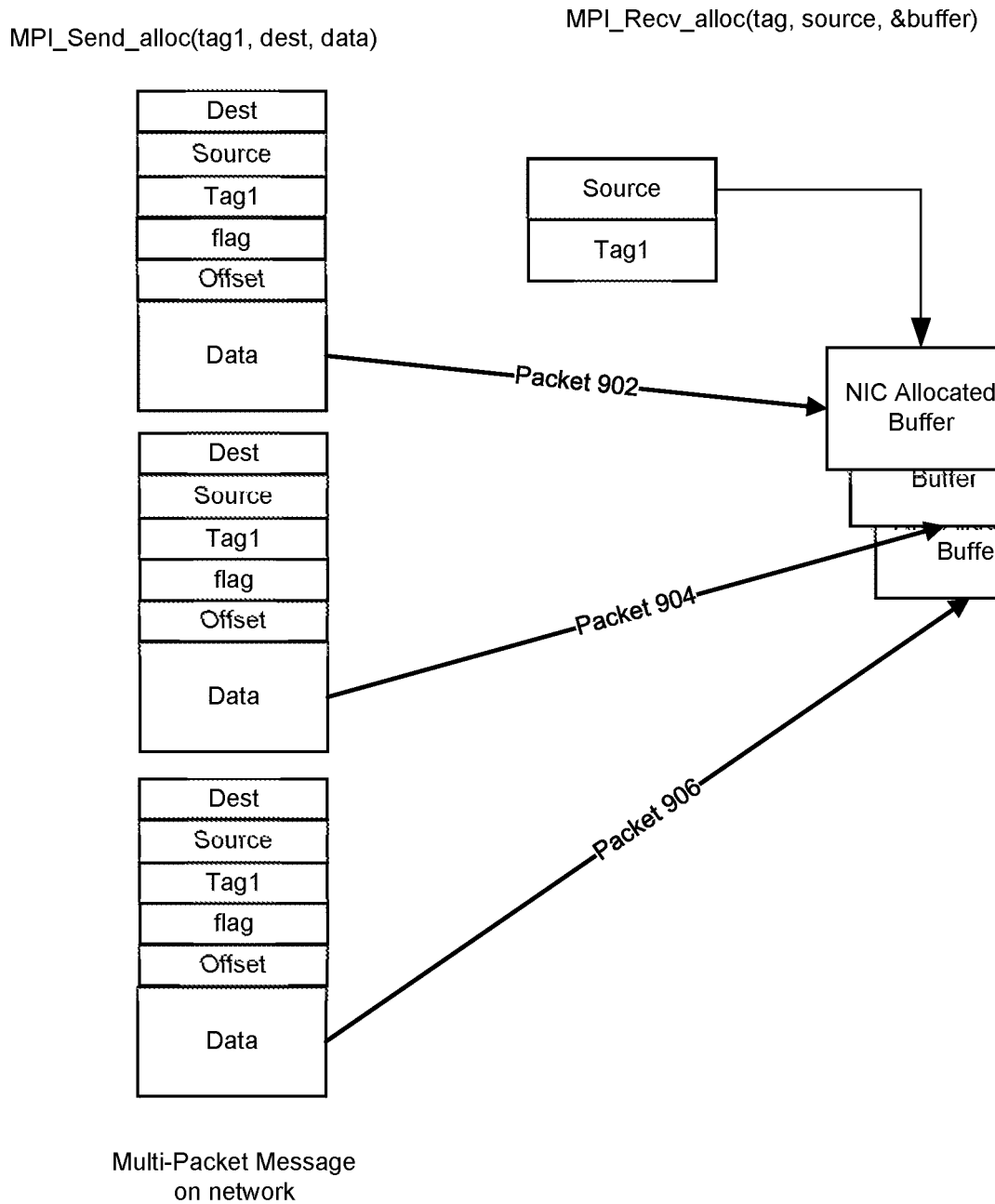
FIG. 9 shows pipelining of the processing that can reduce overall execution time for a collective operation.

FIG. 9 depicts pipelining of processing that can reduce overall execution time for a collective operation. Separate buffers can be allocated to messages and MPI processing can make forward progress on processing of packet contents in buffers. As messages are not exposed to the application, the NIC may not assemble a complete message prior to MPI processing a portion of the message. A message can represent a specific subset of the original vector. Upon receipt of the individual packet the MPI Collective can immediately perform computations using the partial vector.

In this particular example, packets 902, 904 and 906 are sent by a sender with a flag that indicates the receiver NIC can place packets 902, 904 and 906 in a buffer selected by the receiver NIC. Packets 902, 904 and 906 can include a tag that is value Tag1. The receiver NIC can allocate packets 902, 904 and 906 into separate buffers. Using one or more MPI_Recv_alloc calls (described earlier), the receiver NIC can identify each buffer that stores packets 902, 904 and 906 as well as a source (sender) and tag value of value Tag1, although packets 902, 904 and 906 can have any tag value.

Since each packet is processed individually, the network or receiver NIC need not deliver received packets within a given message in order. This permits the receiver NIC to further optimize error handling or take advantage of out-of-order network delivery mechanisms (e.g., adaptive routing, dispersive routing or multi-NIC load balancing) which may be available in the network. Some embodiments of error handling optimizations may involve recovery from lost packets by only requesting re-transmission of the specific lost packet, but permit delivery all valid packets which followed the lost packet even if received out-of-order.

In some embodiments, a buffer in the NIC buffer pool can be allocated to be at most a packet size. Packets stored in the buffers can be processed by the MPI collective (e.g., All-Reduce or Reduce) as they arrive. Packet size limits can be predicted as the network will define a Maximum Transfer Unit (MTU) which sets an upper bound for packet size. NIC performance and pipelining characteristics may be used to determine the overall size of the buffer pool, such that the buffer pool has enough resources to handle a variety of collective message sizes. In addition, various embodiments can permit the receiver NIC to process packets out-of-order to determine a receiver buffer, simplifying recovery mechanisms for lost packets and permitting networks to deliver packets out-of-order.

A buffer in a pool can be returned to the pool after a packet is processed from the buffer.

Figure 10A:
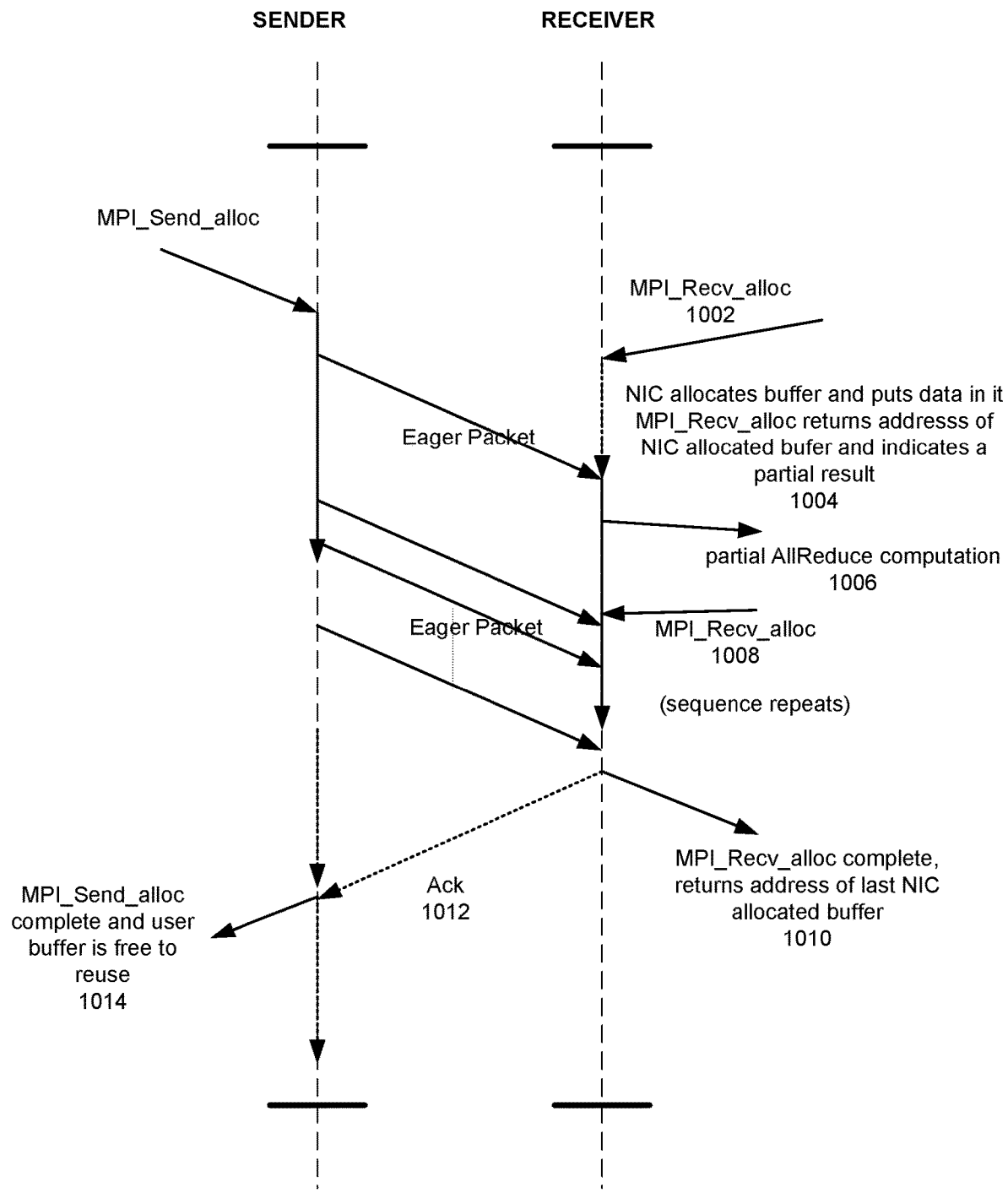
FIG. 10A depicts an example sequence or single operation to allocate a buffer for use to store data to be processed by a receiver MPI layer.

FIG. 10A depicts an example sequence or single operation to process a single point-to-point message within a collective such as AllReduce. In this example, the receiver allocates a buffer per packet and the receiver's MPI layer performs the AllReduce computations on packets received at the NIC as the packets arrive. In this example, a sender side operation is similar to that described with respect to FIG. 8A. On the receiver side, at 1002, MPI_Recv_alloc call indicates that the receiver requests to use NIC allocated buffers to receive the message. At 1004, in response to receipt of a packet with a flag that indicates the receiver NIC can place content of received packet in a buffer selected by the receiver NIC, the receiver NIC can select a buffer to store content of the received packet. At 1004, the receiver NIC allocates a buffer for the received packet and indicates its arrival.

At 1006, an MPI collective (not shown) can perform an AllReduce computation on any available portion of a received vector in a buffer. At 1008, an MPI layer can issue a MPI_Recv_alloc (described earlier) to prepare for receipt of the next packet. The sequence can repeat until at 1010, where the last portion of the vector or data is received, and the NIC can indicate the completion of MPI_Recv_alloc (described earlier) to return an identifier of NIC allocated buffer that includes the final portion of the vector as well as an associated tag value.

Figure 10B:
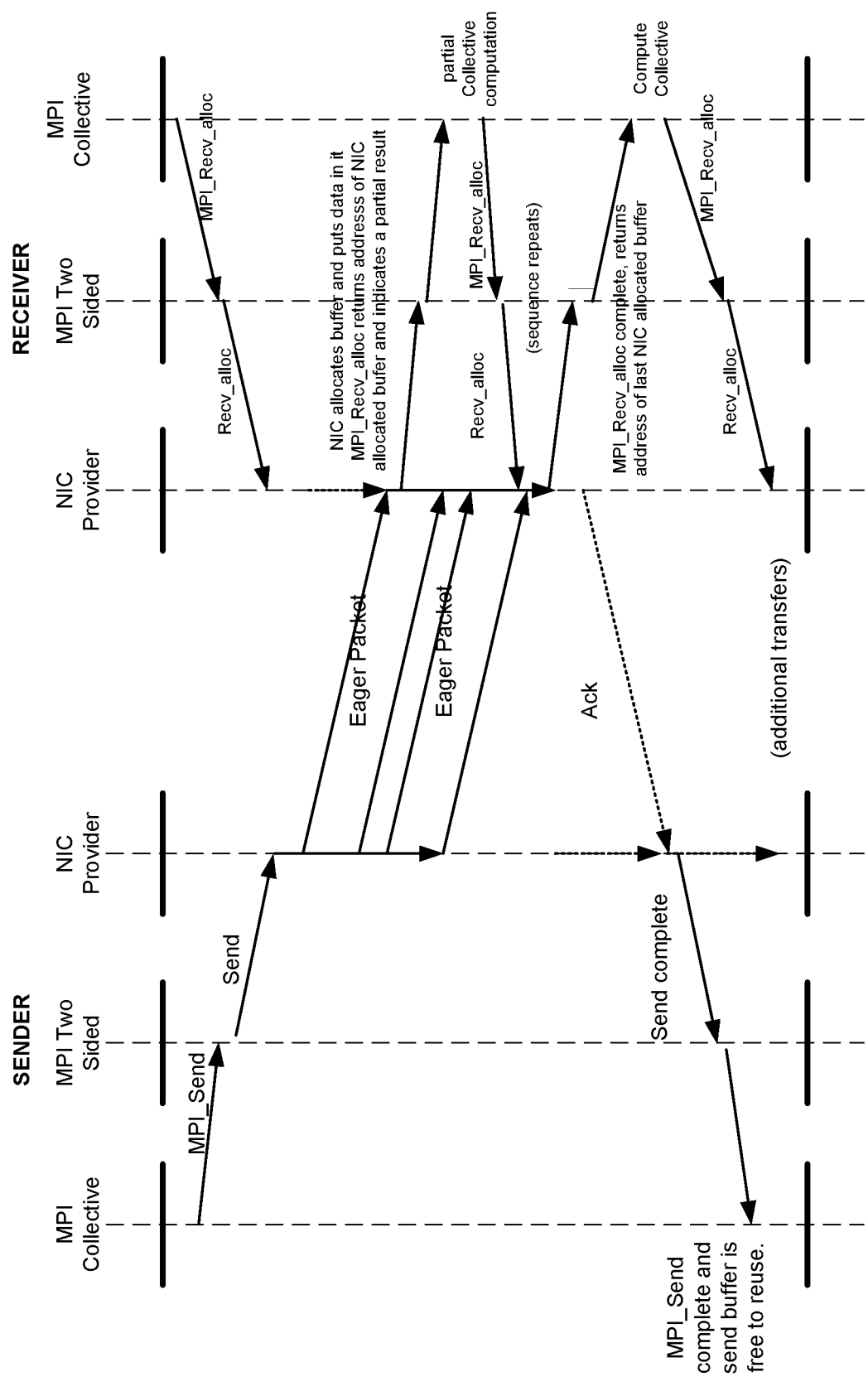
FIG. 10B depicts an example sequence or single operation to allocate a buffer for use to store data to be processed by a receiver MPI layer.

FIG. 10B depicts an example sequence or single operation to process a single point to point message within a collective such as AllReduce. In this example, the receiver allocates a buffer per packet and the receiver's MPI layer performs the AllReduce computations as the packets arrive. In some examples, sender side operation is similar to that described with respect to FIG. 8B. In some examples, at the receiver side, MPI Collective can use a call MPI_Recv_alloc to indicate the receiver request to use NIC allocated buffers to receive the message. As described earlier, MPI_Recv_alloc can include fields tag, source, and buffer. In fields of MPI_Recv_alloc, MPI Two Sided communication layer can indicate expectation to receive a tag from a particular source (e.g., source IP or source MAC address) and the receiver NIC can use choose any allocated buffer to use to place a message with a particular tag into the buffer.

Multiple packets can be transmitted from the sender to the receiver NIC. When a packet arrives at the receiver NIC, the receiver NIC can allocate a buffer from available buffers and place the data from the packet in the buffer. NIC provider or driver can provide an address of the buffer with the matching packet as well as a tag identifier and source identifier in call MPI_Recv_alloc to MPI Two Sided. For example, the receiver NIC can provide an MPI_Recv_alloc completion to MPI Two Sided layer. In fields of MPI_Recv_alloc completion or return, NIC Provider can indicate the previous MPI_Recv_alloc for the specified tag and source was received and a selected buffer was used to store received data as part of a received message.

The receiver NIC can provide a portion of each individual packet (e.g., payload) into a buffer accessible to the receiver's MPI Collective as a partial message. One or more messages can include a subset of the original vector. Upon receipt of a portion of an individual packet, the MPI Collective can perform computations using the partial vector (e.g., subset of a vector). When the last packet of a given message arrives to complete receipt of the entire vector, the NIC can indicate receipt of the entire vector to the MPI Collective as a MPI_Recv_alloc completion or return. The MPI Collective can perform its final partial collective computation and then proceed to the next step to provide the computed data to an application's buffer for access by the application.

The collective computation can been pipelined, with computations performed as packets are received. Various embodiments can reduce computation latency since when the last packet in the message is received only one packet's worth of computation remains to be done as opposed to computation over an entire vector. Any type of arithmetic computation can be performed. In some embodiments, the NIC allocated buffer may be selected from a pool of single packet buffers which are being used for other NIC packet processing. Such an embodiment can permit hardware designed for FIG. 4B can be used without modification for the system of FIG. 10B.

Figure 11:
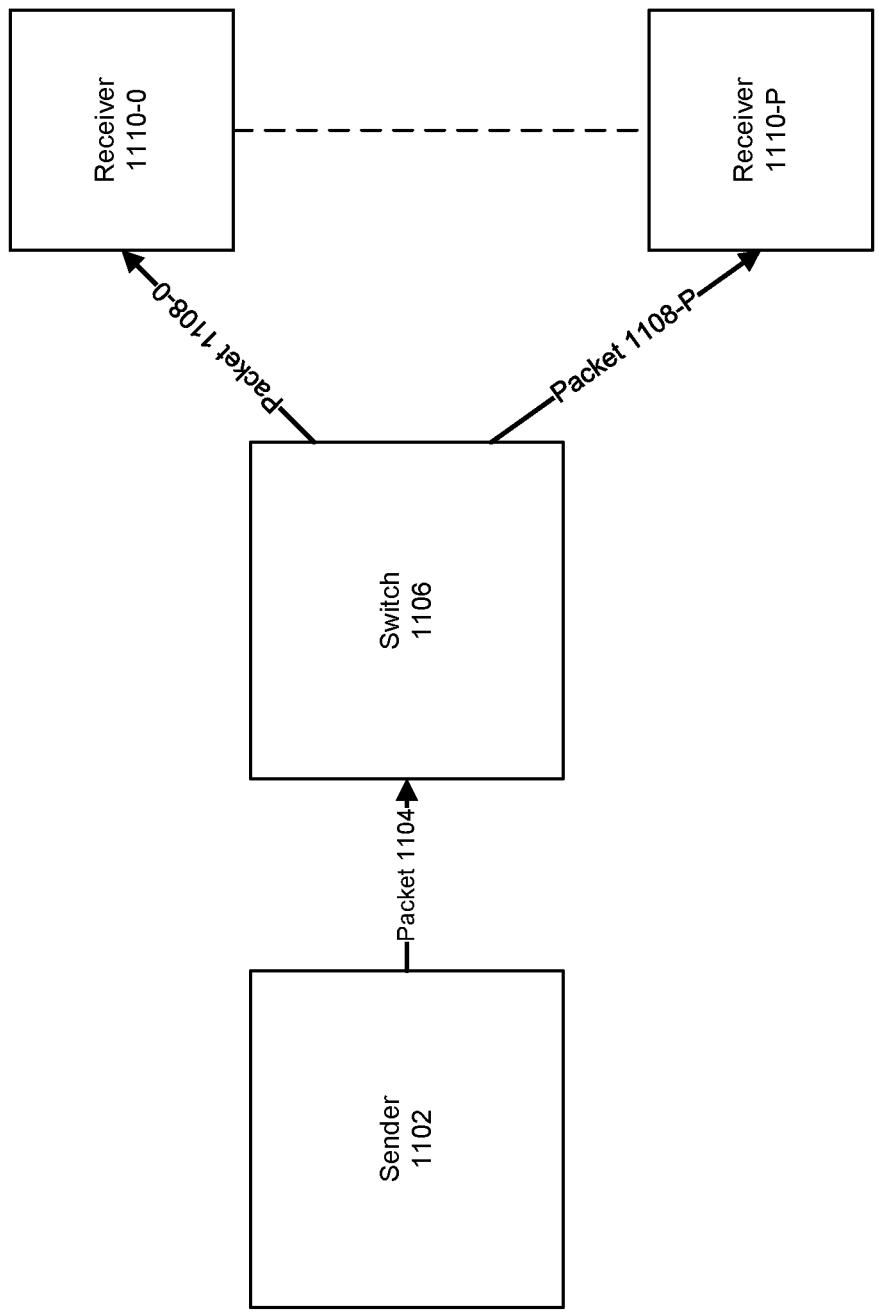
FIG. 11 depicts an example system that can be used to provide replication of packets sent to multiple receiver nodes as part of a parallel computation environment.

FIG. 11 depicts an example system that can be used to provide replication of packets sent to multiple receiver nodes as part of a parallel computation environment. Some AllReduce operations can use a network switch to distribute data via multicast. Instead of sender 1102 sending a vector to multiple receivers by sending one copy to first receiver and one copy to second receiver, sender 1102 can configure switch 1106 to distribute the vector to multiple receivers. In some examples, sender 1102 can inform switch 1106 to transmit packet 1104 to multiple receivers 1110-0 to 1110-P, where P is an integer that is 1 or greater. Switch 1106 can be configured to replicate packet 1104 and send the replicated packets 1108-0 to 1108-P with destination address corresponding to respective receivers 1110-0 to 1110-P. For example, techniques described with respect to U.S. Pat. Nos. 10,015,056 and 9,391,845 can be used to configure switch 1106 to replicate a packet but send the packet to different destination devices.

Switch 1106 can perform multicast of a packet to implement various collectives such as Broadcast and AllReduce. In accordance with various embodiments, message transfers may avoid bounce buffers, take advantage of NIC based buffer allocation, and permit pipelining of AllReduce processing.

Figure 12A:
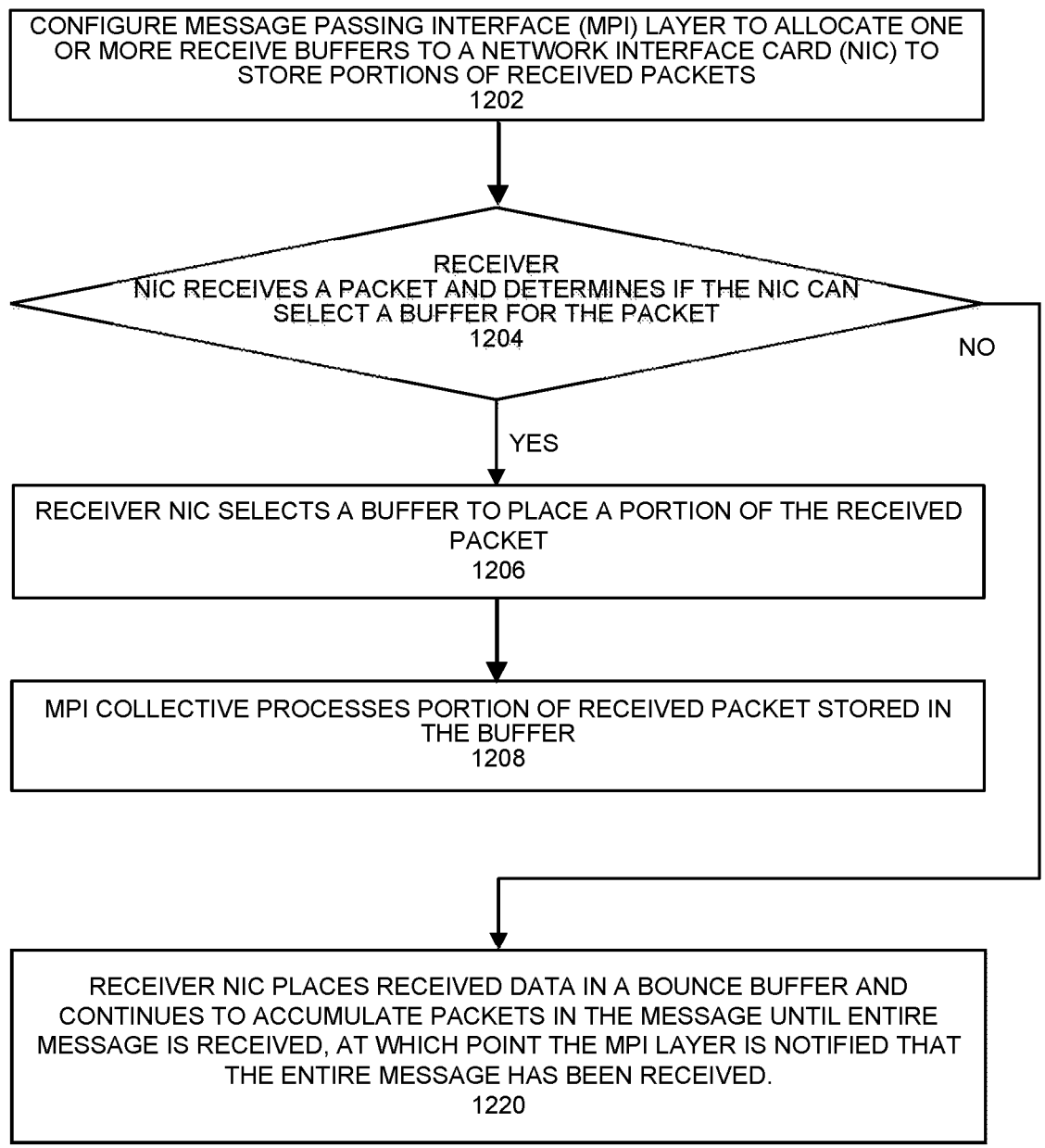
FIGS. 12A and 12B depict example processes for collective processing of data.

FIG. 12A depicts an example process for collective processing of data. The process can be performed at or after an application commences execution on at least two computing nodes for parallel computation. An application can be considered peer applications in a parallel computation environment. For example, an application can perform one or more of Reduce, AllReduce, and Broadcast. An application can be involved in sending and receive vectors in connection with parallel computation by applications executed on other computing platform nodes. The application can perform training of a machine learning inference engine using the process.

At 1202, an MPI layer is configured to allocate one or more receive buffers to store portions of received messages from another computing node as part of a parallel computing operation. In some examples, an MPI layer configures a NIC to select one or more buffers to store any received packet with a flag that indicates the receiver NIC can select a buffer to store a portion of the received packet.

At 1204, the receiver NIC receives a packet and determines if the receiver NIC can select buffer to store a portion of the packet. In some examples, a received packet can be sent from a sender NIC. In some examples, a received packet can be received from a switch that receives a packet from a sender NIC, replicates a packet, provides destination address information, and sends the replicated packet to two or more destinations instead of the sender NIC sending copies of packet data to two or more destinations. In some examples, if a flag in the received packet indicates that the receiver NIC can select a buffer to store the portion of the received packet, then the receiver NIC can select a buffer to store a message in the received packet. In some examples, if a flag in the received packet indicates that the receiver NIC cannot select a buffer to store the portion of the received packet, then the receiver NIC cannot select a buffer to store the portion of the received packet and is to place the packet in a bounce buffer if no buffer is allocated for the packet or into a buffer associated with a designated buffer associated with a tag and source of the received packet. If the receiver NIC can select a buffer to store the portion of the received packet, the process continues to 1206. If the receiver NIC is not to select a buffer to store the portion of the received packet, the process continues to 1220. In some examples, the receiver NIC can acknowledge receipt of the packet by sending an acknowledgement message to the sender.

At 1206, the receiver NIC can select a buffer and copy a portion of the received packet into the selected buffer and indicate the buffer allocated for a particular tag and sender (e.g., source) to an MPI layer. At 1208, the MPI collective can process the portion of the received packet stored in a buffer. The data can be a vector or a portion of a vector. After processing of the vector or the data in the received packet (e.g., by summation or other arithmetic operation or minimum or maximum finding operation), the MPI collective can make the processed data available to an application. In some examples, the data is an entire segment of data to be process (e.g., vector). In some examples, the data is a portion of a segment and the MPI collective processes the data that is received but waits for the entire data to be received and processed before providing the final result to an application buffer by an application. The MPI layer can release the buffer for use by the receiver NIC to store a portion of another received packet.

At 1220, the receiver NIC can place received data in a buffer allocated to store a portion of the received packet and indicate to the MPI layer that the buffer allocated for a particular tag and sender (e.g., source) is available to process. After processing of the vector or the data in the received packet, the MPI collective can make the processed data available to an application buffer for access by an application. In some examples, the data is an entire segment of data to be process (e.g., vector). The MPI layer can release the buffer for use by the receiver NIC to store a portion of another received packet.

Figure 12B:
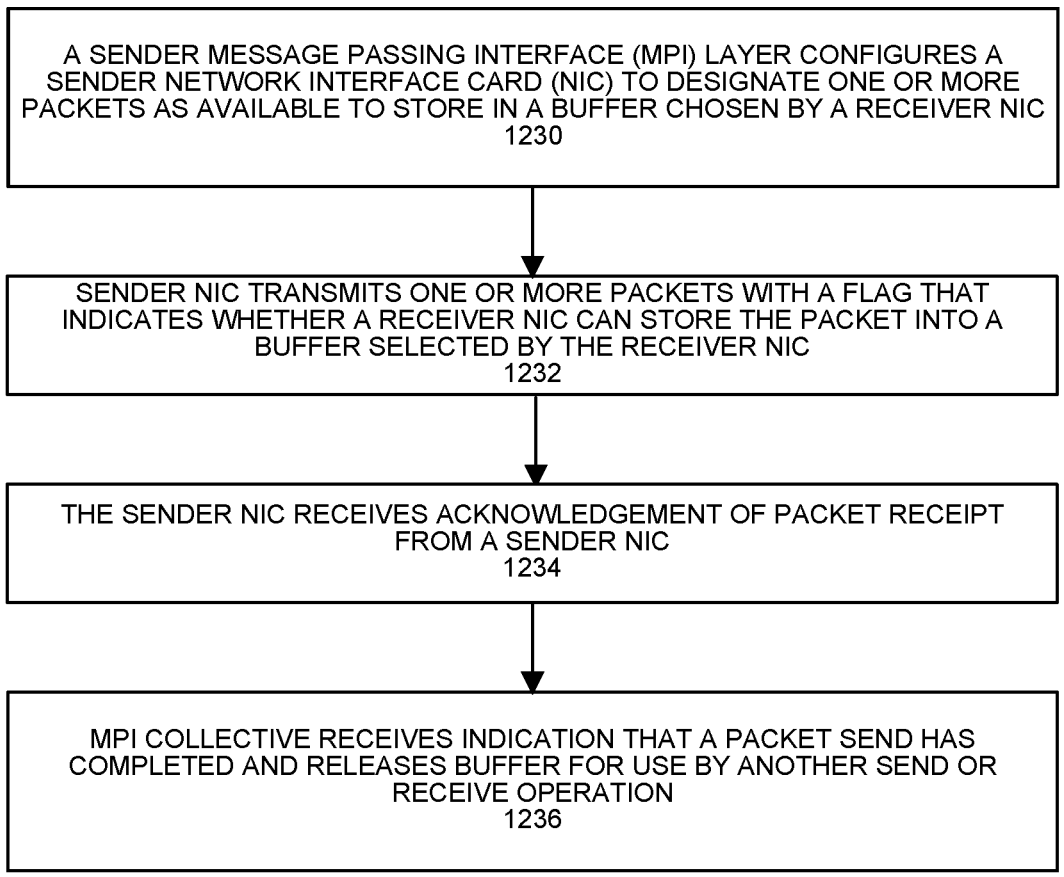

FIG. 12B depicts an example process performed by a computing node to prepare for sending data in packets for processing by MPI layers in one or more other computing node. The process can be performed at or after an application commences execution on at least two computing nodes for parallel computation.

At 1230, a sender MPI layer configures an ability of a sender NIC to generate packets for transmission to one or more other computing nodes such that the packets include a flag that indicates receiver NIC can or cannot select buffer to store a portion of a received packet. For example, if the receiver NIC can select a buffer to store a portion of a received, the receiver NIC can select the buffer from one or more available buffers. For example, a sender MPI layer can configure the sender NIC to generate packets with a flag that indicates whether the receiver NIC can select a buffer to store a portion of a received packet.

At 1232, a sender NIC can transmit one or more packets with flag that indicates whether the receiver NIC can select a buffer to store message in packet. In some examples, a received packet can be received from a switch that receives a packet from a sender NIC, replicates the packet, provides destination address information, and sends the replicated packet to two or more destinations instead of the sender NIC sending copies of packet data to two or more destinations.

At 1234, the sender NIC can receive an acknowledgement of receipt from a receiver NIC. The acknowledgement can be received from a receiver NIC that received the one or more transmitted packets. At 1236, an MPI collective executed at the sender compute node can receive an indication that a send is complete. The MPI collective can release the send buffer to reuse for sending other payloads or receiving other payloads.

Figure 13:
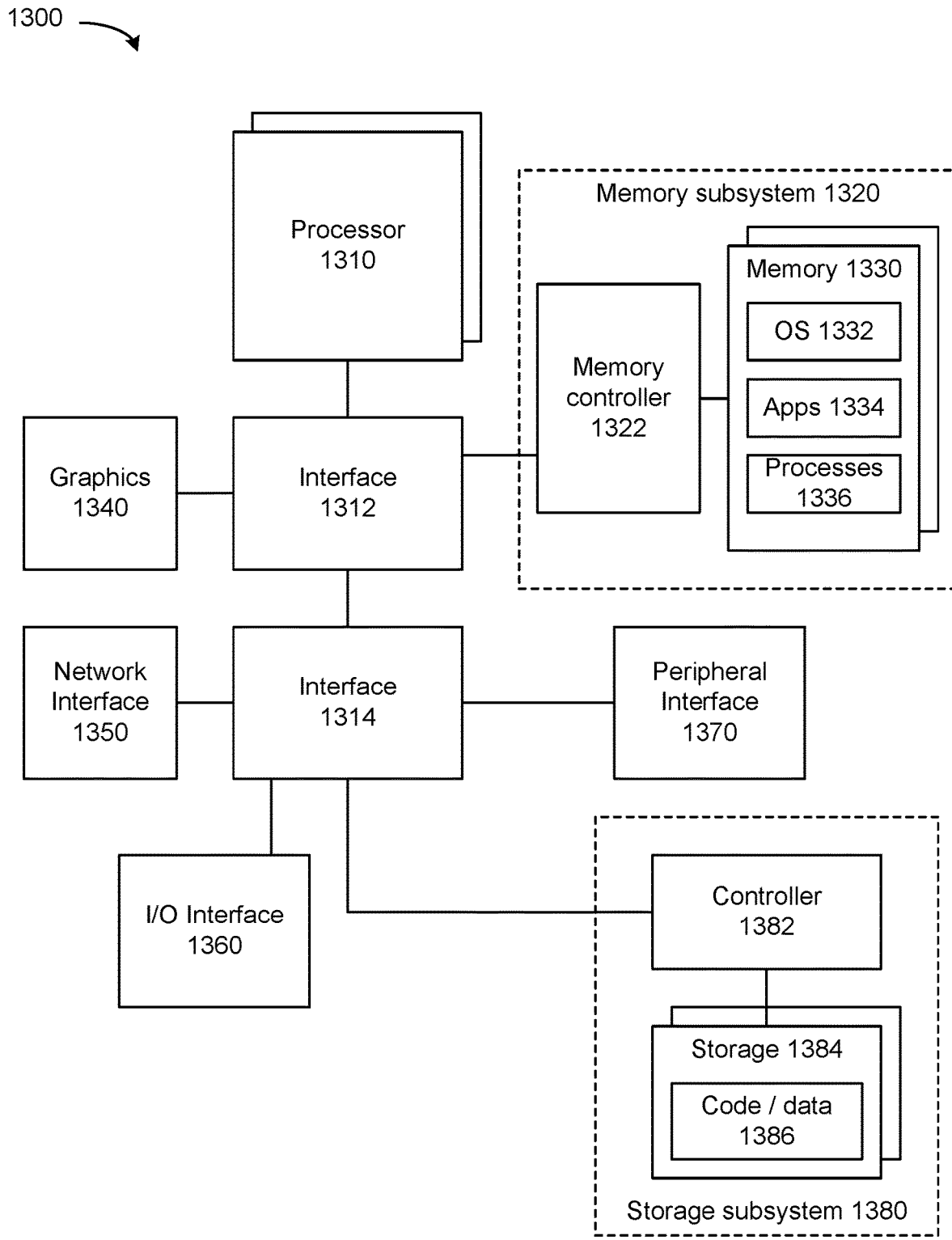
FIG. 13 depicts a system.

FIG. 13 depicts an example system. The system can use embodiments described herein to perform provide data used in parallel computation. System 1300 includes processor 1310, which provides processing, operation management, and execution of instructions for system 1300. Processor 1310 can include any type of microprocessor, central processing unit (CPU), graphics processing unit (GPU), processing core, or other processing hardware to provide processing for system 1300, or a combination of processors. Processor 1310 controls the overall operation of system 1300, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1300 includes interface 1312 coupled to processor 1310, which can represent a higher speed interface or a high throughput interface for system components that needs higher bandwidth connections, such as memory subsystem 1320 or graphics interface components 1340, or accelerators 1342. Interface 1312 represents an interface circuit, which can be a standalone component or integrated onto a processor die. Where present, graphics interface 1340 interfaces to graphics components for providing a visual display to a user of system 1300. In one example, graphics interface 1340 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1340 generates a display based on data stored in memory 1330 or based on operations executed by processor 1310 or both. In one example, graphics interface 1340 generates a display based on data stored in memory 1330 or based on operations executed by processor 1310 or both.

Accelerators 1342 can be a programmable or fixed function offload engine that can be accessed or used by a processor 1310. For example, an accelerator among accelerators 1342 can provide compression (DC) capability, cryptography services such as public key encryption (PKE), cipher, hash/authentication capabilities, decryption, or other capabilities or services. In some embodiments, in addition or alternatively, an accelerator among accelerators 1342 provides field select controller capabilities as described herein. In some cases, accelerators 1342 can be integrated into a CPU socket (e.g., a connector to a motherboard or circuit board that includes a CPU and provides an electrical interface with the CPU). For example, accelerators 1342 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1342 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1320 represents the main memory of system 1300 and provides storage for code to be executed by processor 1310, or data values to be used in executing a routine. Memory subsystem 1320 can include one or more memory devices 1330 such as read-only memory (ROM), flash memory, one or more varieties of random access memory (RAM) such as DRAM, or other memory devices, or a combination of such devices. Memory 1330 stores and hosts, among other things, operating system (OS) 1332 to provide a software platform for execution of instructions in system 1300. Additionally, applications 1334 can execute on the software platform of OS 1332 from memory 1330. Applications 1334 represent programs that have their own operational logic to perform execution of one or more functions. Processes 1336 represent agents or routines that provide auxiliary functions to OS 1332 or one or more applications 1334 or a combination. OS 1332, applications 1334, and processes 1336 provide software logic to provide functions for system 1300. In one example, memory subsystem 1320 includes memory controller 1322, which is a memory controller to generate and issue commands to memory 1330. It will be understood that memory controller 1322 could be a physical part of processor 1310 or a physical part of interface 1312. For example, memory controller 1322 can be an integrated memory controller, integrated onto a circuit with processor 1310.

While not specifically illustrated, it will be understood that system 1300 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1300 includes interface 1314, which can be coupled to interface 1312. In one example, interface 1314 represents an interface circuit, which can include standalone components and integrated circuitry. In one example, multiple user interface components or peripheral components, or both, couple to interface 1314. Network interface 1350 provides system 1300 the ability to communicate with remote devices (e.g., servers or other computing devices) over one or more networks. Network interface (e.g., NIC) 1350 can include an Ethernet adapter, wireless interconnection components, cellular network interconnection components, USB (universal serial bus), or other wired or wireless standards-based or proprietary interfaces. Network interface 1350 can transmit data to a device that is in the same data center or rack or a remote device, which can include sending data stored in memory. Network interface 1350 can receive data from a remote device, which can include storing received data into memory. Various embodiments can be used in connection with network interface 1350, processor 1310, and memory subsystem 1320.

In one example, system 1300 includes one or more input/output (I/O) interface(s) 1360. I/O interface 1360 can include one or more interface components through which a user interacts with system 1300 (e.g., audio, alphanumeric, tactile/touch, or other interfacing). Peripheral interface 1370 can include any hardware interface not specifically mentioned above. Peripherals refer generally to devices that connect dependently to system 1300. A dependent connection is one where system 1300 provides the software platform or hardware platform or both on which operation executes, and with which a user interacts.

In one example, system 1300 includes storage subsystem 1380 to store data in a nonvolatile manner. In one example, in certain system implementations, at least certain components of storage 1380 can overlap with components of memory subsystem 1320. Storage subsystem 1380 includes storage device(s) 1384, which can be or include any conventional medium for storing large amounts of data in a nonvolatile manner, such as one or more magnetic, solid state, or optical based disks, or a combination. Storage 1384 holds code or instructions and data 1386 in a persistent state (e.g., the value is retained despite interruption of power to system 1300). Storage 1384 can be generically considered to be a "memory," although memory 1330 is typically the executing or operating memory to provide instructions to processor 1310. Whereas storage 1384 is nonvolatile, memory 1330 can include volatile memory (e.g., the value or state of the data is indeterminate if power is interrupted to system 1300). In one example, storage subsystem 1380 includes controller 1382 to interface with storage 1384. In one example controller 1382 is a physical part of interface 1314 or processor 1310 or can include circuits or logic in both processor 1310 and interface 1314.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In some embodiments, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1300. More specifically, power source typically interfaces to one or multiple power supplies in system 1300 to provide power to the components of system 1300. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1300 can be implemented using interconnected compute sleds of processors, memories, storages, network interfaces, and other components. High speed interconnects can be used such as PCIe, Ethernet, or optical interconnects (or a combination thereof).

Figure 14:
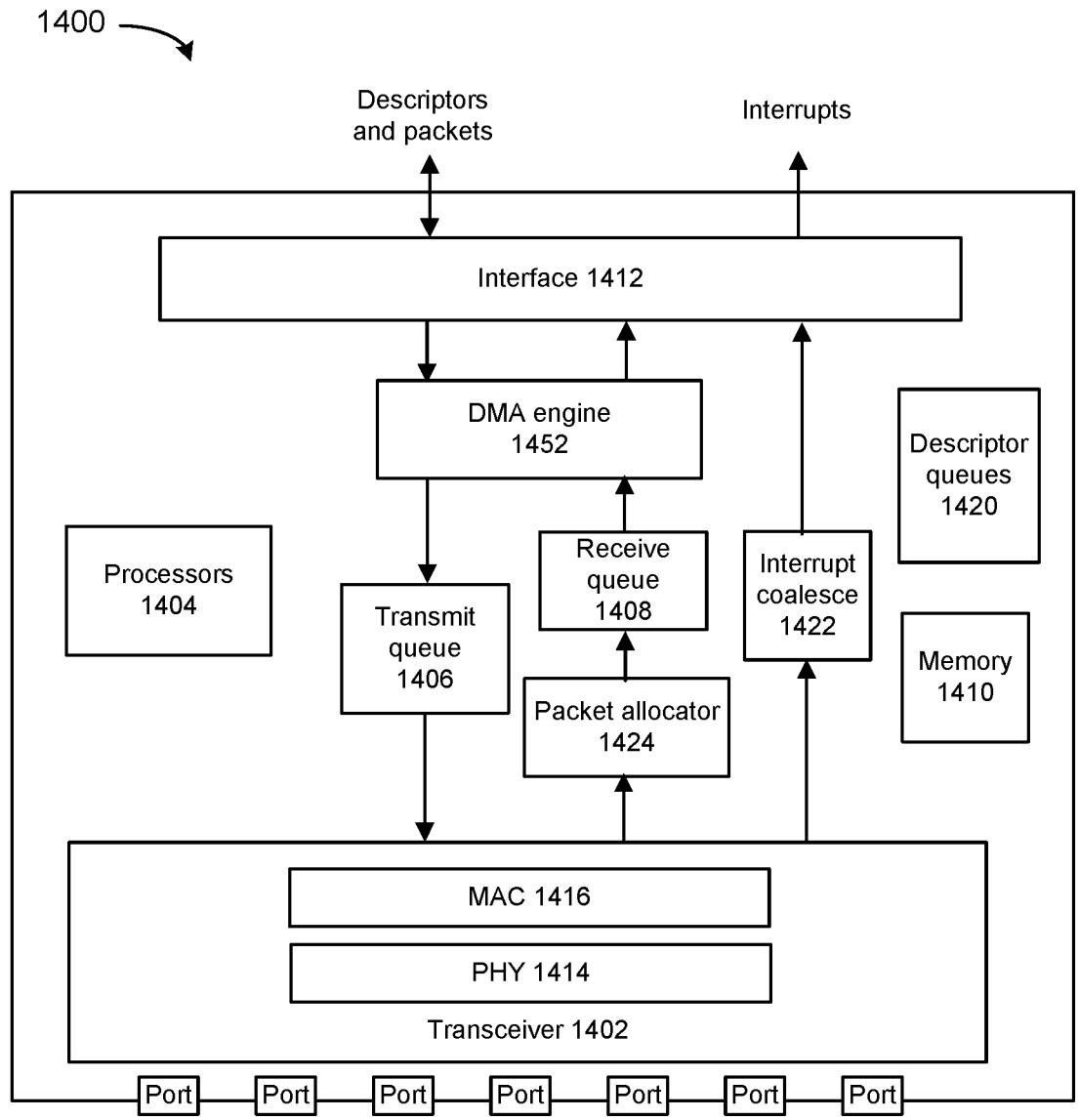
FIG. 14 depicts an example network interface controller.

FIG. 14 depicts a network interface that can use embodiments or be used by embodiments. In some embodiments, network interface can be used to send or receive data used in parallel computation. In some examples, network interface 1400 can execute any of the MPI layer described herein. In some examples, network interface 1400 can be implemented as a network interface controller, network interface card, switch, a host fabric interface (HFI), host channel adapter (HCA), or host bus adapter (HBA), and such examples can be interchangeable. Network interface 1400 can be coupled to one or more servers using a bus, PCIe, CXL, or DDR. Network interface 1400 may be embodied as part of a system-on-a-chip (SoC) that includes one or more processors, or included on a multichip package that also contains one or more processors.

Network interface 1400 can include transceiver 1402, processors 1404, transmit queue 1406, receive queue 1408, memory 1410, and interface 1412, and DMA engine 1452. Transceiver 1402 can be capable of receiving and transmitting packets in conformance with the applicable protocols such as Ethernet as described in IEEE 802.3, although other protocols may be used (e.g., InfiniBand). Transceiver 1402 can receive and transmit packets from and to a network via a network medium (not depicted). Transceiver 1402 can include PHY circuitry 1414 and media access control (MAC) circuitry 1416. PHY circuitry 1414 can include encoding and decoding circuitry (not shown) to encode and decode data packets according to applicable physical layer specifications or standards. MAC circuitry 1416 can be configured to assemble data to be transmitted into packets, that include destination and source addresses along with network control information and error detection hash values. Processors 1404 can be any a combination of a: processor, core, graphics processing unit (GPU), field programmable gate array (FPGA), application specific integrated circuit (ASIC), or other programmable hardware device that allow programming of network interface 1400. For example, processors 1404 can perform a determination of whether a received packet can be stored in a buffer selected by network interface 1400. For example, a "smart network interface" can provide packet processing capabilities in the network interface using processors 1404.

Packet allocator 1424 can provide distribution of received packets for processing by multiple CPUs or cores using timeslot allocation described herein or RSS. When packet allocator 1424 uses RSS, packet allocator 1424 can calculate a hash or make another determination based on contents of a received packet to determine which CPU or core is to process a packet.

Interrupt coalesce 1422 can perform interrupt moderation whereby network interface interrupt coalesce 1422 waits for multiple packets to arrive, or for a time-out to expire, before generating an interrupt to host system to process received packet(s). Receive Segment Coalescing (RSC) can be performed by network interface 1400 whereby portions of incoming packets are combined into segments of a packet. Network interface 1400 provides this coalesced packet to an application.

Direct memory access (DMA) engine 1452 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device.

Memory 1410 can be any type of volatile or non-volatile memory device and can store any queue or instructions used to program network interface 1400. Transmit queue 1406 can include data or references to data for transmission by network interface. Receive queue 1408 can include data or references to data that was received by network interface from a network. Descriptor queues 1420 can include descriptors that reference data or packets in transmit queue 1406 or receive queue 1408 and corresponding destination memory regions. Interface 1412 can provide an interface with host device (not depicted). For example, interface 1412 can be compatible with PCI, PCI Express, PCI-x, Serial ATA, and/or USB compatible interface (although other interconnection standards may be used).

In some examples, processors 1404 can perform one or more of: large receive offload (LRO), large send/segmentation offload (LSO), Remote Direct Memory Access (RDMA) protocols (e.g. InfiniBand, RoCE, iWARP, and so forth), TCP segmentation offload (TSO), Transport Layer Security (TLS) offload, receive side scaling (RSS) to allocate a queue or core to process a payload. LRO can refer to reassembling incoming network packets and transfer packet contents (e.g., payloads) into larger contents and transferring the resulting larger contents but fewer packets for access by the host system or a VEE.

LSO can refer to generating a multipacket buffer and providing content of the buffer for transmission. A host device can build a larger TCP message (or other transport layer) (e.g., 64 KB in length) and processors 1404 can segment the message into smaller data packets for transmission.

TLS is defined at least in The Transport Layer Security (TLS) Protocol Version 1.3, RFC 8446 (August 2018). TLS offload can refer to offload of encryption or decryption of contents in accordance with TLS in processors 1404. Network interface 1400 can receive data for encryption and perform the encryption of data prior to transmission of encrypted data in one or more packets. Network interface 1400 can receive packets and decrypt content of packets prior to transfer of decrypted data to a host system. In some examples, any type of encryption or decryption be performed such as but not limited to Secure Sockets Layer (SSL).

Figure 15:
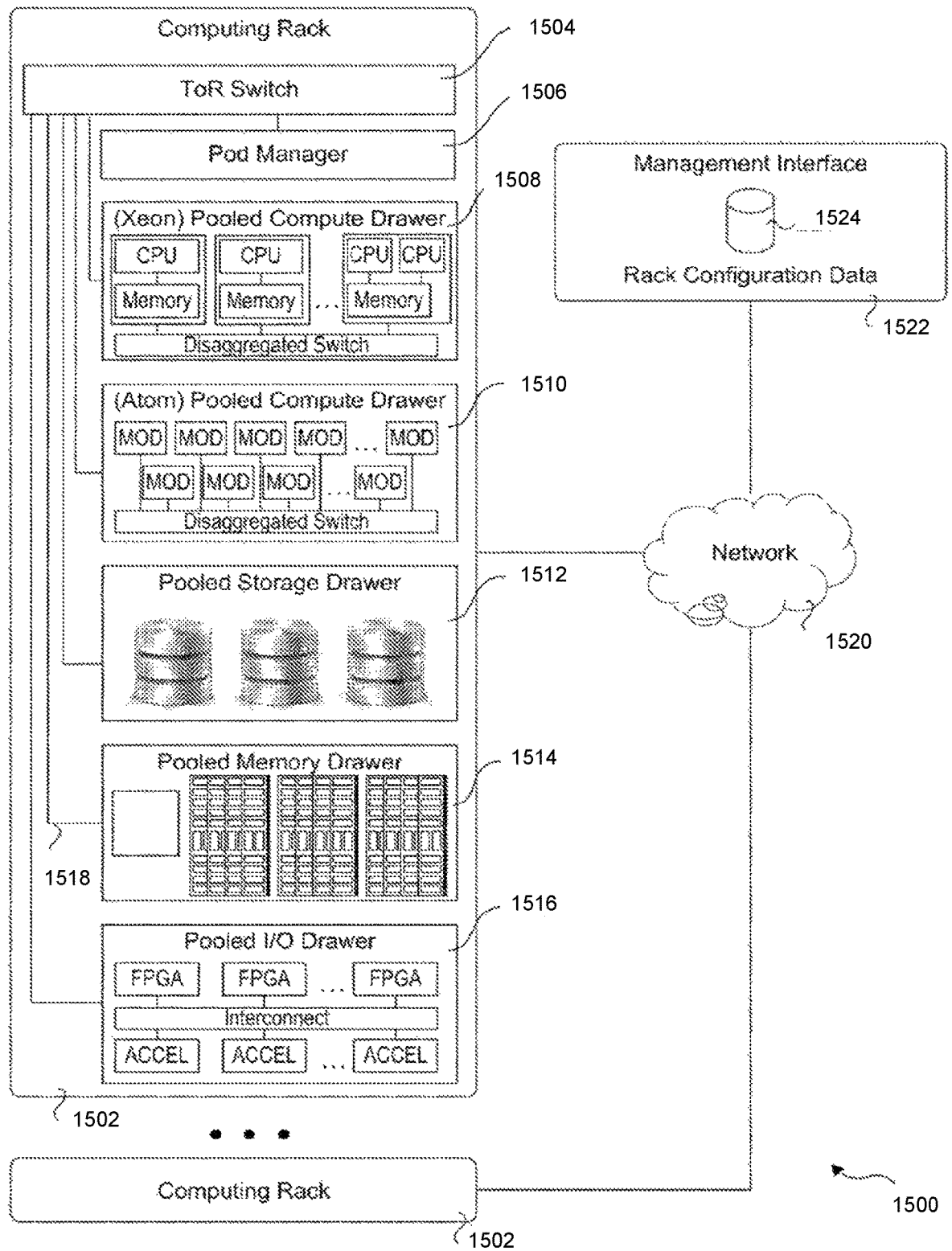
FIG. 15 depicts an example environment.

FIG. 15 depicts an environment 1500 includes multiple computing racks 1502, each including a Top of Rack (ToR) switch 1504, a pod manager 1506, and a plurality of pooled system drawers. The environment can use embodiments described herein to transmit and store data used in parallel computations. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1508, and Intel® ATOM™ pooled compute drawer 1510, a pooled storage drawer 1512, a pooled memory drawer 1514, and a pooled I/O drawer 1516. Each of the pooled system drawers is connected to ToR switch 1504 via a high-speed link 1518, such as a 40 Gigabit/second (Gb/s) or 100 Gb/s Ethernet link or a 100+Gb/s Silicon Photonics (SiPh) optical link. In some embodiments, high-speed link 1518 comprises an 800 Gb/s SiPh optical link.

Multiple of the computing racks 1502 may be interconnected via their ToR switches 1504 (e.g., to a pod-level switch or data center switch), as illustrated by connections to a network 1520. In some embodiments, groups of computing racks 1502 are managed as separate pods via pod manager(s) 1506. In some embodiments, a single pod manager is used to manage all of the racks in the pod. Alternatively, distributed pod managers may be used for pod management operations.

Environment 1500 further includes a management interface 1522 that is used to manage various aspects of the environment. This includes managing rack configuration, with corresponding parameters stored as rack configuration data 1524. Environment 1500 can be used for computing racks.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'".

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes a method comprising: receiving, at a network interface, an allocation of a first group of one or more buffers to store data to be processed by a Message Passing Interface (MPI) and based on a received packet including an indicator that permits the network interface to select a buffer for the received packet and store the received packet in the selected buffer, the network interface storing a portion of the received packet in a buffer of the first group of the one or more buffers.

Example 2 includes any example, wherein the indicator permits the network interface to select a buffer for the received packet and store the received packet in the selected buffer irrespective of a tag and sender associated with the received packet.

Example 3 includes any example, and includes receiving, at the network interface, an allocation of a second group of one or more buffers to store data to be processed by the MPI layer and based on a second received packet including an indicator that does not permit storage of the received packet in a buffer irrespective of a tag and source associated with the second received packet, the network interface to store a portion of the second received packet in a buffer of the second group of one or more buffers, wherein the buffer of the second group of one or more buffers corresponds to a tag and source associated with the second received packet.

Example 4 includes any example, and includes identifying the buffer selected by the network interface to the MPI layer by indicating one or more of: a buffer identifier, tag identifier, or source of the received packet.

Example 5 includes any example, and includes the MPI layer processing the portion of the received packet in the buffer of the first group of the one or more buffers and when or after data the MPI layer completes processing the portion of the received packet in the buffer of the first group of the one or more buffers, copying the processed portion from the buffer selected by the network interface into an application result buffer for access by an application.

Example 6 includes any example, wherein the portion of the received packet comprises a subset of a vector and the MPI layer processes one or more subsets of the vector.

Example 7 includes any example, wherein the portion of the received packet comprises a complete vector and the MPI layer processes the complete vector.

Example 8 includes any example, and includes the MPI performing a sum for an AllReduce operation based on the portion of the received packet.

Example 9 includes any example, wherein the received packet comprises a replica packet received from a switch that replicated a packet.

Example 10 includes any example, and includes a method that includes configuring a network interface to identify whether a packet, sent as part of a Message Passing Interface (MPI) collective computation, is permitted to be copied to a buffer selected by a receiver network interface irrespective of a tag and source associated with the packet.

Example 11 includes any example, and includes: including an indicator in the packet that identifies that the packet is permitted to be copied to a buffer selected by a receiver network interface irrespective of a tag and source associated with the packet.

Example 12 includes any example, wherein the MPI collective computation comprises part of an AllReduce operation.

Example 13 includes any example, and includes an apparatus that includes a network interface comprising a processor and a bus interface, the processor configured to: receive an allocation of a first group of one or more buffers to store data to be processed by a Message Passing Interface (MPI) layer and based on a received packet including an indicator that permits storage of the received packet in a buffer selected by the network interface irrespective of a tag and source associated with the received packet, cause storage of a portion of the received packet in a buffer of the first group of the one or more buffers.

Example 14 includes any example, wherein the processor is to: receive an allocation of a second group of one or more buffers to store data to be processed by the MPI layer and based on a second received packet including an indicator that does not permit storage of the received packet in a buffer irrespective of a tag and source associated with the second received packet, cause storage of a portion of the second received packet in a buffer of the second group of one or more buffers, wherein the buffer of the second group of one or more buffers corresponds to a tag and source associated with the second received packet.

Example 15 includes any example, wherein the processor is to identify the buffer selected by the network interface to the MPI layer by indication of one or more of: a buffer identifier, tag identifier, and source of the received packet.

Example 16 includes any example, and includes a second processor that is to: perform an MPI layer processing of the portion of the received packet in the buffer of the first group of the one or more buffers and when or after data the MPI layer completes processing the portion of the received packet in the buffer of the first group of the one or more buffers, cause a copy the processed portion into an application result buffer for access by an application.

Example 17 includes any example, wherein the portion of the received packet comprises a subset of a vector and the MPI layer is to process one or more subsets of the vector.

Example 18 includes any example, wherein the portion of the received packet comprises a complete vector and the MPI layer is to process the complete vector.

Example 19 includes any example, wherein perform an MPI layer processing of the portion of the received packet is to provide a sum for an AllReduce operation.

Example 20 includes any example, wherein the received packet comprises a replica packet received from a switch that replicated a packet.

Example 21 includes any example, and includes a server, rack, or datacenter to process the portion of the received packet in a buffer of the first group of the one or more buffers.

What is claimed is:

1. A method comprising:
receiving, at a network interface device, an allocation of a first group of one or more buffers to store data to be processed by a Message Passing Interface (MPI);
based on a received packet including a command that causes the network interface device to select a buffer for the received packet and store the received packet in the selected buffer, the network interface device storing a portion of the received packet in a buffer of the first group of the one or more buffers to be processed by the MPI;
receiving, at the network interface device, an allocation of a second group of one or more buffers to store data to be processed by the MPI; and
based on a second received packet including an indicator that indicates to store the second received packet in a buffer based on a tag and source associated with the second received packet, the network interface device storing a portion of the second received packet in a buffer of the second group of one or more buffers, wherein the buffer of the second group of one or more buffers corresponds to the tag and source associated with the second received packet.

2. The method of claim 1, wherein the command that causes the network interface device to select the buffer for the received packet and store the received packet in the selected buffer causes the network interface device to select the buffer for the received packet and store the received packet in the selected buffer irrespective of a tag and sender associated with the received packet.

3. The method of claim 1, comprising identifying the buffer selected by the network interface device to the MPI by indicating one or more of: a buffer identifier, tag identifier, or source of the received packet.

4. The method of claim 1, comprising:
the MPI processing the portion of the received packet in the buffer of the first group of the one or more buffers and
when or after data the MPI completes processing the portion of the received packet in the buffer of the first group of the one or more buffers, copying the processed portion from the buffer selected by the network interface device into an application result buffer for access by an application.

5. The method of claim 4, wherein the portion of the received packet comprises a subset of a vector and the MPI processes one or more subsets of the vector.

6. The method of claim 4, wherein the portion of the received packet comprises a complete vector and the MPI processes the complete vector.

7. The method of claim 1, comprising:
the MPI performing a sum for an AllReduce operation based on the portion of the received packet.

8. The method of claim 1, wherein the received packet comprises a replica packet received from a switch that replicated a packet.

9. A method comprising:
configuring a network interface device to:
include a command in a packet, sent as part of a Message Passing Interface (MPI) collective computation, to cause a receiver network interface to select a buffer and copy a portion of the packet to the buffer selected by the receiver network interface irrespective of a tag and source associated with the packet and
include a second command in a second packet, sent as part of the MPI collective computation, to cause the receiver network interface to select a second buffer and copy a portion of the second packet to the second buffer selected by the receiver network interface based on a tag and source associated with the second packet.

10. The method of claim 9, wherein the MPI collective computation comprises part of an AllReduce operation.

11. An apparatus comprising:
a network interface device comprising a processor and a host interface, the processor configured to:
receive an allocation of a first group of one or more buffers to store data to be processed by a Message Passing Interface (MPI) layer;
based on a received packet including a command that causes storage of the received packet in a buffer of the first group of the one or more buffers selected by the network interface device irrespective of a tag and source associated with the received packet, cause storage of a portion of the received packet in the selected buffer of the first group of the one or more buffers;
receive an allocation of a second group of one or more buffers to store data to be processed by the MPI layer; and
based on a second received packet including a command that indicates to store the second received packet in a buffer based on a tag and source associated with the second received packet, cause storage of a portion of the second received packet in a buffer of the second group of one or more buffers, wherein the buffer of the second group of one or more buffers corresponds to the tag and source associated with the second received packet.

12. The apparatus of claim 11, wherein the processor is to identify the buffer selected by the network interface device to the MPI layer by indication of one or more of: a buffer identifier, tag identifier, and source of the received packet.

13. The apparatus of claim 11, comprising a second processor that is to:
perform an MPI layer processing of the portion of the received packet in the buffer of the first group of the one or more buffers and
when or after data the MPI layer completes processing the portion of the received packet in the buffer of the first group of the one or more buffers, cause a copy the processed portion into an application result buffer for access by an application.

14. The apparatus of claim 13, wherein the portion of the received packet comprises a subset of a vector and the MPI layer is to process one or more subsets of the vector.

15. The apparatus of claim 13, wherein the portion of the received packet comprises a complete vector and the MPI layer is to process the complete vector.

16. The apparatus of claim 13, wherein perform an MPI layer processing of the portion of the received packet is to provide a sum for an AllReduce operation.

17. The apparatus of claim 11, wherein the received packet comprises a replica packet received from a switch that replicated a packet.

18. The apparatus of claim 11, comprising a server, rack, or datacenter to process the portion of the received packet in a buffer of the first group of the one or more buffers.

19. The method of claim 1, comprising:
based on a third received packet including a command that does not permit the network interface device to select a buffer for the third received packet and store the third received packet in the selected buffer, the network interface device storing a portion of the third received packet in a buffer corresponding to a tag and source associated with the third received packet.

* * * * *